US009008600B2

(12) United States Patent
Chien et al.

(10) Patent No.: US 9,008,600 B2
(45) Date of Patent: Apr. 14, 2015

(54) WIRELESS COMMUNICATION RECEIVER HAVING ONE SIGNAL PROCESSING CIRCUIT WHOSE OPERATION MODE IS ADJUSTED BY MONITORING SIGNAL LEVEL OF SPECIFIC SIGNAL OF PRECEDING SIGNAL PROCESSING CIRCUIT AND RELATED WIRELESS COMMUNICATION METHOD

(75) Inventors: George Chien, Saratoga, CA (US);
Chi-Yao Yu, Hsinchu County (TW);
Siu-Chuang Ivan Lu, San Jose, CA (US); Yen-Horng Chen, Taipei (TW);
Chih-Chun Tang, Taipei (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 359 days.

(21) Appl. No.: 13/082,392

(22) Filed: Apr. 7, 2011

(65) Prior Publication Data

US 2011/0287729 A1 Nov. 24, 2011

Related U.S. Application Data

(60) Provisional application No. 61/346,958, filed on May 21, 2010.

(51) Int. Cl.
*H04W 52/02* (2009.01)

(52) U.S. Cl.
CPC .................................. *H04W 52/0235* (2013.01)

(58) Field of Classification Search
USPC .......... 455/226.1, 232.1, 234.1, 241.1, 245.2, 455/250.1, 251.1
See application file for complete search history.

(56) References Cited

U.S. PATENT DOCUMENTS

| 7,299,021 | B2* | 11/2007 | Pärssinen et al. ........... 455/226.1 |
| 7,664,211 | B2* | 2/2010 | Solum ............................ 375/345 |
| 7,991,087 | B2* | 8/2011 | Solum ............................ 375/345 |
| 8,098,779 | B2* | 1/2012 | Komninakis et al. ......... 375/346 |
| 8,290,100 | B2* | 10/2012 | Komninakis et al. ......... 375/346 |
| 2002/0142745 | A1* | 10/2002 | Kang et al. .................. 455/232.1 |
| 2003/0025623 | A1* | 2/2003 | Brueske et al. ............... 341/139 |
| 2005/0026583 | A1* | 2/2005 | Carpineto et al. .......... 455/232.1 |
| 2006/0148437 | A1* | 7/2006 | Krivokapic ................ 455/232.1 |
| 2010/0167681 | A1 | 7/2010 | Chien |

FOREIGN PATENT DOCUMENTS

| CN | 1135130 A | 11/1996 |
| CN | 1765070 A | 4/2006 |
| CN | 1922791 A | 2/2007 |

\* cited by examiner

*Primary Examiner* — Blane J Jackson
(74) *Attorney, Agent, or Firm* — Winston Hsu; Scott Margo

(57) ABSTRACT

A wireless communication receiver includes a first signal processing circuit, a second signal processing circuit, and a detecting circuit. The first signal processing circuit generates a first processed signal by processing a received radio frequency (RF) signal. The second signal processing circuit is coupled to the first signal processing circuit. The detecting circuit monitors a specific signal of the first signal processing circuit and generates at least a control signal to the second signal processing circuit in response to a signal level of the monitored specific signal. The control signal controls the second signal processing circuit to switch from a first operation mode to a second operation mode.

32 Claims, 20 Drawing Sheets

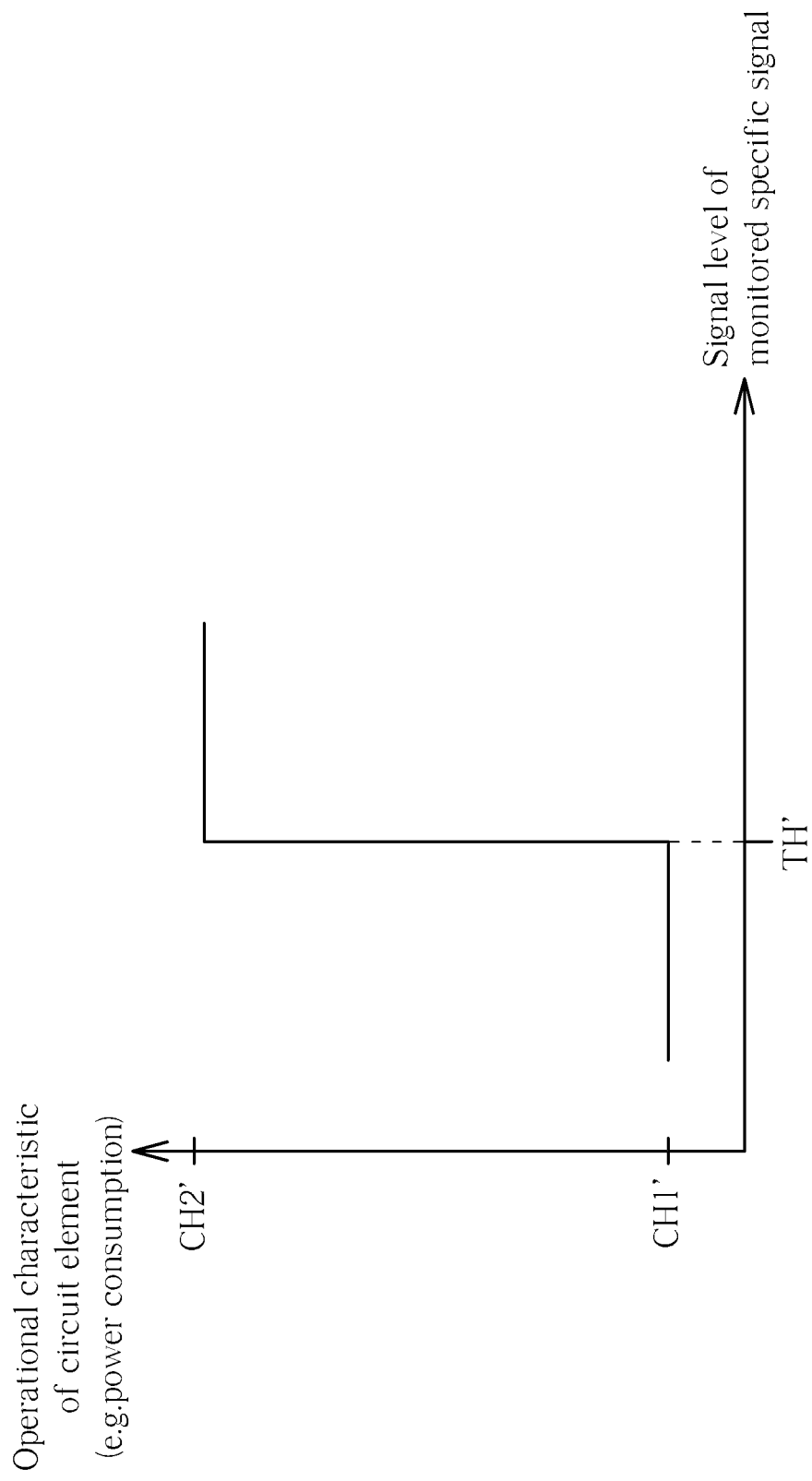

WIRELESS COMMUNICATION RECEIVER HAVING ONE SIGNAL PROCESSING CIRCUIT WHOSE OPERATION MODE IS ADJUSTED BY MONITORING SIGNAL LEVEL OF SPECIFIC SIGNAL OF PRECEDING SIGNAL PROCESSING CIRCUIT AND RELATED WIRELESS COMMUNICATION METHOD

CROSS REFERENCE TO RELATED APPLICATIONS

This application claims the benefit of U.S. provisional application No. 61/346,958, filed on May 21, 2010 and incorporated herein by reference.

BACKGROUND

The disclosed embodiments of the present invention relate to wireless communications, and more particularly, to a wireless communication receiver having one signal processing circuit whose operation mode is adjusted by monitoring a signal level of a specific signal of a preceding signal processing circuit and related wireless communication method.

A wireless communication receiver is devised for receiving a wanted signal in a wanted frequency band. However, the existence of a large blocker signal may significantly degrade the performance of the wireless communication receiver. For example, when there is a large blocker signal beside the small wanted signal, the gain compression resulted from the nonlinearity of the active components within the wireless communication receiver may make the wanted signal smaller. In addition, the blocker signal may induce additional noise due to the nonlinearity of the active components. To solve above problems, the conventional solution is to improve the linearity of the wireless communication receiver. Moreover, reciprocal mixing in the wireless communication receiver may also induce additional noise. To solve this problem, the conventional solution is to improve the phase noise of the local oscillator (LO) signal.

In most of the cases, improving the linearity of the wireless communication receiver and the phase noise of the LO signal is at the expense of more current. This leads to larger power consumption, inevitably. Consider a case where a wireless communication receiver receives large blocking signal beside the wanted signal. To deal with the large blocking signal, in general, the mixer module in the receiver has to use large-sized switches (transistors) to improve the linearity. Unfortunately, large-sized switches (transistors) have parasitical capacitors with larger capacitive values, resulting in a heavy load to the LO signal generator. Thus, the LO signal generator is required to consume more current for successfully driving the large-sized switches (transistors). If the phase noise improvement of the LO signal is also taken into consideration, the total power consumption of the LO signal generator would be quite large.

However, under most operating conditions, the linearity and phase noise performance exceeds what is actually needed since the existence of strong blocking signals is rare. Therefore, there is a need for an innovative receiver design which can adaptively adjust the power consumption of a wireless communication receiver according to an actual operating condition of the wireless communication receiver.

SUMMARY

In accordance with exemplary embodiments of the present invention, a wireless communication receiver having one signal processing circuit whose operation mode is adjusted by monitoring a signal level of a specific signal of a preceding signal processing circuit and related wireless communication method are proposed to solve the above-mentioned problems.

According to one aspect of the present invention, an exemplary wireless communication receiver is disclosed. The exemplary wireless communication receiver includes a first signal processing circuit, a second signal processing circuit, and a detecting circuit. The first signal processing circuit is arranged to receive a radio frequency (RF) signal, and generate a first processed signal by processing the received RF signal. The second signal processing circuit is coupled to the first signal processing circuit. The detecting circuit is arranged to monitor a specific signal of the first signal processing circuit and generate at least a control signal to the second signal processing circuit in response to a signal level of the monitored specific signal. The control signal controls the second signal processing circuit to switch from a first operation mode to a second operation mode.

According to another aspect of the present invention, an exemplary wireless communication method is disclosed. The exemplary wireless communication method includes: utilizing a first signal processing circuit to receive a radio frequency (RF) signal and generate a first processed signal by processing the received RF signal; coupling a second signal processing circuit to the first signal processing circuit; and monitoring a specific signal of the first signal processing circuit and generating at least a control signal to the second signal processing circuit in response to a signal level of the monitored specific signal. The control signal controls the second signal processing circuit to switch from a first operation mode to a second operation mode.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 10C is a diagram illustrating a second piece-wise transfer function of mapping a signal level of a monitored specific signal of a first signal processing circuit to a configured operational characteristic of at least one circuit element within the second signal processing circuit.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The main conception of the present invention is to monitor the actual operating condition of a wireless communication receiver and then adaptively adjust the operational characteristic of at least one circuit component within the wireless communication receiver. More specifically, the performance of the wireless communication receiver can be adaptively tuned according to the detected blocker signal level.

Figure 1:
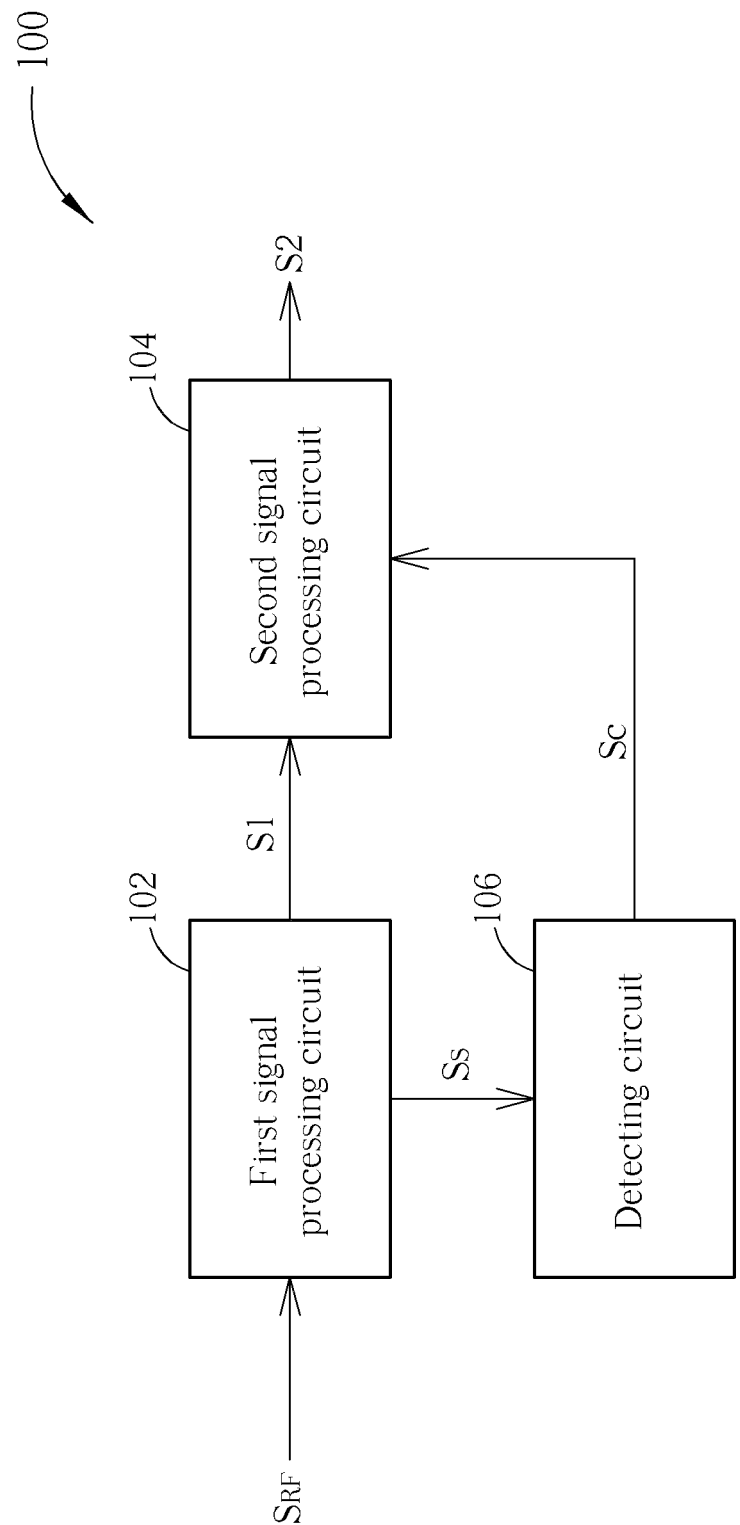
FIG. 1 is a block diagram illustrating a generalized wireless communication receiver according to an exemplary embodiment of the present invention.

FIG. 1 is a block diagram illustrating a generalized wireless communication receiver according to an exemplary embodiment of the present invention. The exemplary wireless communication receiver 100 includes a first signal processing circuit 102, a second signal processing circuit 104, and a detecting circuit 106. The first signal processing circuit 102 is arranged to receive a radio frequency (RF) signal $S_{RF}$, and generate a first processed signal S1 by processing the received RF signal $S_{RF}$, where the frequencies of $S_{RF}$ and S1 can be the same or different. The second signal processing circuit 104 is coupled to the first signal processing circuit 102, and arranged to receive the first processed signal S1 and generate a second processed signal S2 by processing the received first processed signal S1. The detecting circuit 106 is coupled to the first signal processing circuit 102 and the second signal processing circuit 104, and arranged to monitor a specific signal $S_S$ of the first signal processing circuit 102 and generate at least a control signal $S_C$ to the second signal processing circuit 104 in response to a signal level/power level of the monitored specific signal $S_S$. The control signal $S_c$ generated from the detecting circuit 106 controls the second signal processing circuit 104 to switch from one operation mode to another operation mode when the detecting circuit 106 determines that the signal level of the monitored specific signal $S_S$ meets a criterion. Therefore, based on the signal level of the monitored specific signal $S_S$ of the first signal processing circuit 102 that precedes the second signal processing circuit 104, the second signal processing circuit 104 is adaptively adjusted to change its operation mode. For example, monitoring the specific signal $S_S$ of the first signal processing circuit 102 is to monitor the existence of a large blocker signal. Thus, when it is determined that the signal level of the monitored specific signal $S_S$ has reached the predetermined level, the existence of the undesired blocker signal is acknowledged by the detecting circuit 106. Next, the detecting circuit 106 makes the second signal processing circuit 104 operating under a first operation mode to enter a second operation mode, where the second signal processing circuit 104 operating under the second operation mode would have better linearity and phase noise performance. In this way, the undesired affects resulted from the large blocker signal can be mitigated or avoided.

As mentioned above, the control signal $S_c$ is generated in response to the signal level/power level of the specific signal $S_S$. However, this by no means implies that the control signal $S_c$ is to deliver a power value to the second signal processing circuit 104. Actually, based on the design consideration/requirement, the control signal $S_c$ is allowed to deliver any control information capable of forcing the following second signal processing circuit 104 to change its operation mode. For example, if the second signal processing circuit 104 is configured to change its operation mode according to a phase value, the detecting circuit 106 would be arranged to generate the control signal $S_c$ representative of the phase value to the second signal processing circuit 104 in response to the signal level/power level of the monitored specific signal $S_S$. To put it simply, no matter what the control signal $S_c$ delivers, the spirit of the present invention is obeyed when the second signal processing circuit 104 changes its operation mode under the control of the control signal $S_c$ that is generated in response to the signal level/power level of the monitored specific signal $S_S$.

Figure 2A:
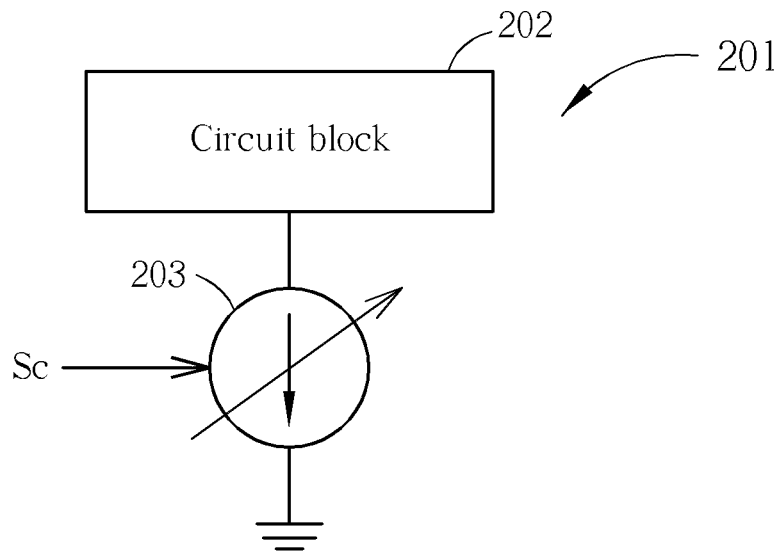
FIG. 2A is a diagram illustrating a first exemplary implementation of a circuit element which is adaptively controlled by a control signal.
Figure 2B:
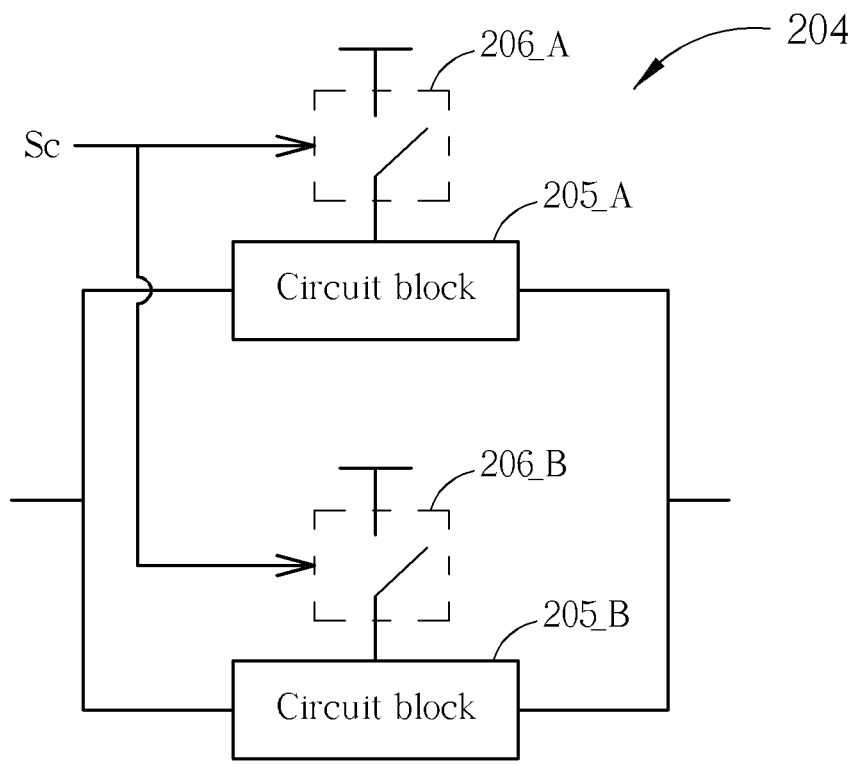
FIG. 2B is a diagram illustrating a second exemplary implementation of a circuit element which is adaptively controlled by a control signal.
Figure 2C:
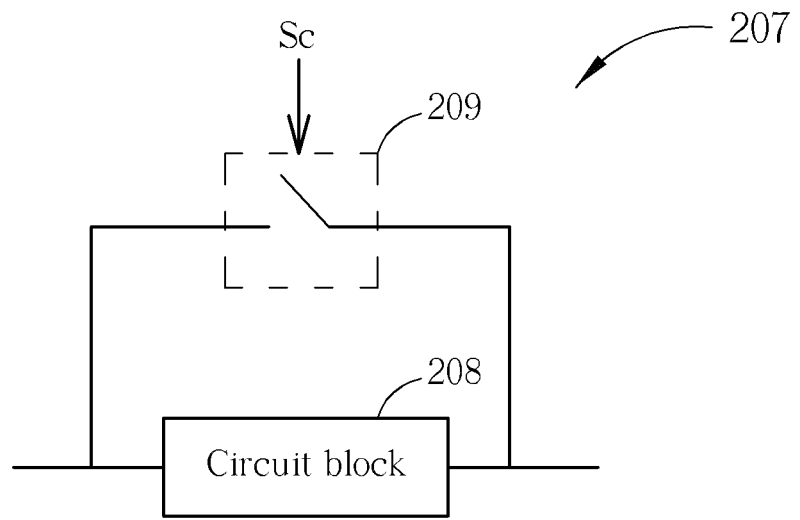
FIG. 2C is a diagram illustrating a third exemplary implementation of a circuit element which is adaptively controlled by a control signal.
Figure 2D:
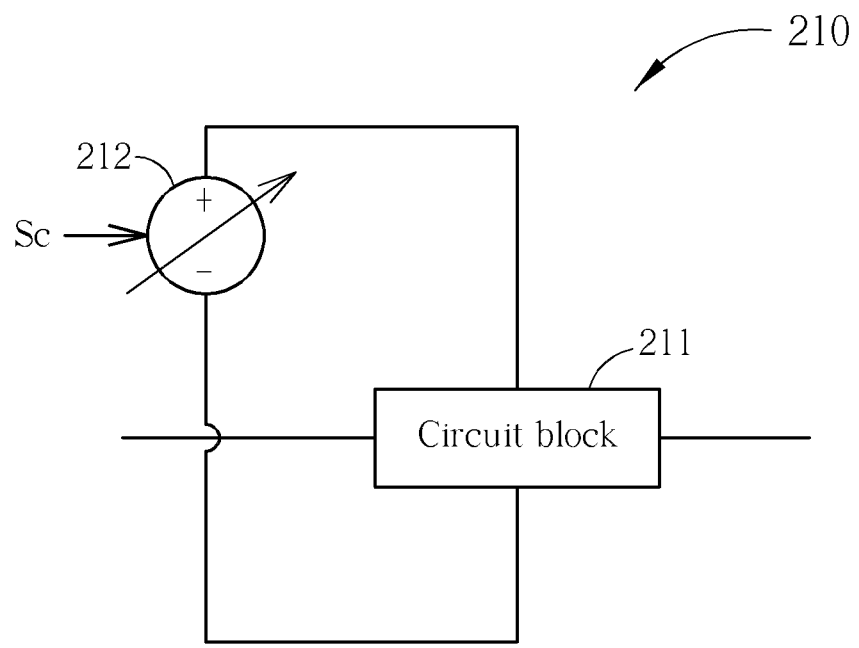
FIG. 2D is a diagram illustrating a fourth exemplary implementation of a circuit element which is adaptively controlled by a control signal.
Figure 2E:
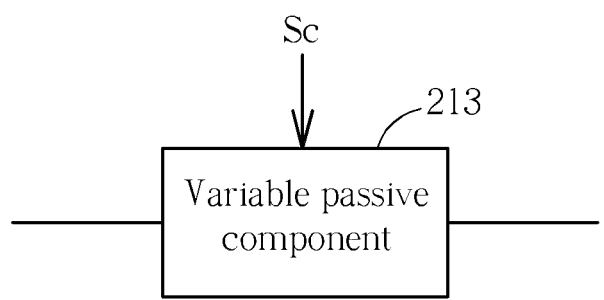
FIG. 2E is a diagram illustrating a fifth exemplary implementation of a circuit element which is adaptively controlled by a control signal.

In one exemplary embodiment, the control signal $S_c$ controls the second signal processing circuit 104 to switch between different operation modes by controlling at least one circuit element in the second signal processing circuit 104 to change its operational characteristic. That is, when the at least one circuit element in the second signal processing circuit 104 has a change in the operational characteristic under the control of the control signal $S_c$, the second signal processing circuit 104 may be regarded as having a transition from one operation mode to another operation mode. FIG. 2A-FIG. 2E show a variety of exemplary implementations of a circuit element which is adaptively controlled by the control signal $S_c$. In FIG. 2A, the circuit element 201 has a circuit block 202 and a controllable current source 203 which provides the circuit block 202 with a bias current. After receiving the control signal $S_c$, the controllable current source 203 adjusts the bias current of the circuit block 202 and accordingly changes the operational characteristic of the circuit element 201. In FIG. 2B, the circuit element 204 includes a plurality of circuit blocks 205_A and 205_B and a plurality of switches 206_A and 206_B. The switches 206_A and 206_B determine if the supply voltage is supplied to the circuit blocks 205_A and 205_B, respectively. In other words, the on/off status of the switch 206_A/206_B controls whether the corresponding circuit block 205_A/205_B is enabled. After receiving the control signal $S_c$, the switches 206_A and 206_B can be properly controlled to change the total number of switched-on switches, thereby changing the operational characteristic of the circuit element 204. In FIG. 2C, the circuit element 207 includes a circuit block 208 and a switch 209 which is controlled by the control signal $S_c$. As the on/off status of the switch 209 controlled by the control signal $S_c$ decides if the circuit element 207 is bypassed, the operational characteristic of the circuit element 207 can be changed when the circuit element 207 receives the control signal $S_c$. In FIG. 2D, the circuit element 210 includes a circuit block 211 and a controllable voltage source 212 which is controlled by the control signal $S_c$. After receiving the control signal $S_c$, the controllable voltage source 212 can adjust the supply voltage of the circuit block 211, thereby changing the operational characteristic of the circuit element 210. In FIG. 2E, the circuit element is implemented using a variable passive component 213 controlled by the control signal $S_c$. After receiving the control signal $S_c$, the variable passive component 213 can change its operational characteristic (e.g., resistance, capacitance, or inductance). Please note that the circuit elements shown in FIG. 2A-FIG. 2E are for illustrative purposes only. That is, any circuit structure with an adjustable operational characteristic can be employed to realize a circuit element within the second signal processing circuit 104 that is controlled by the control signal $S_c$.

The first signal processing circuit 102 and the second signal processing circuit 104 may realize any receiver architecture. For example, the first signal processing circuit 102 and the second signal processing circuit 104 include a plurality of circuit elements for converting the incoming RF signal $S_{RF}$ into a baseband signal (i.e., the second processed signal S2). In one exemplary embodiment, the first signal processing circuit 102 includes a last-stage circuit element arranged to generate and output the first processed signal S1, and the second signal processing circuit 104 includes a first-stage circuit element arranged to receive and process the first processed signal S1, where the circuit behavior of the first signal processing circuit 102 may be affected by the blocker signal, for example, the voltage swing, current swing, DC voltage bias point, and/or DC current. Then, the detecting circuit 106 can monitor the circuit behavior change to find if there is a large blocking signal or not. The performance of the second signal processing circuit 104 will be significantly degraded due to the existence of the blocker signal. Thus, when there is a large blocker signal beside a small wanted signal, one or more circuit elements in the second signal processing circuit 104 should be allowed to consume more current for improving the linearity and/or phase noise performance of the second signal processing circuit 104. By way of example, but not limitation, the above-mentioned last-stage circuit element is a low-noise amplifier (LNA), and the detecting circuit 106 monitors the specific signal $S_c$ associated with the operation of the LNA to determine how to control circuit element(s) within the second signal processing circuit 104. Please refer to FIG. 3, which is a block diagram illustrating an exemplary implementation of the wireless communication receiver 100 shown in FIG. 1. The exemplary wireless communication receiver 300 is based on the circuit structure shown in FIG. 1, and therefore has a first signal processing circuit 302, a second signal processing circuit 304, and a detecting circuit 306, where the first signal processing circuit 302 includes an LNA 312, and the second signal processing circuit 304 includes a mixer module 314, a local oscillator (LO) signal generating module 316, and a baseband signal processing module 318. However, this is for illustrative purposes only. That is, the first signal processing circuit 302 and/or the second signal processing circuit 304 may include additional circuit elements. For example, the first signal processing circuit 302 may also include a matching network (not shown) for impedance matching.

Figure 3:
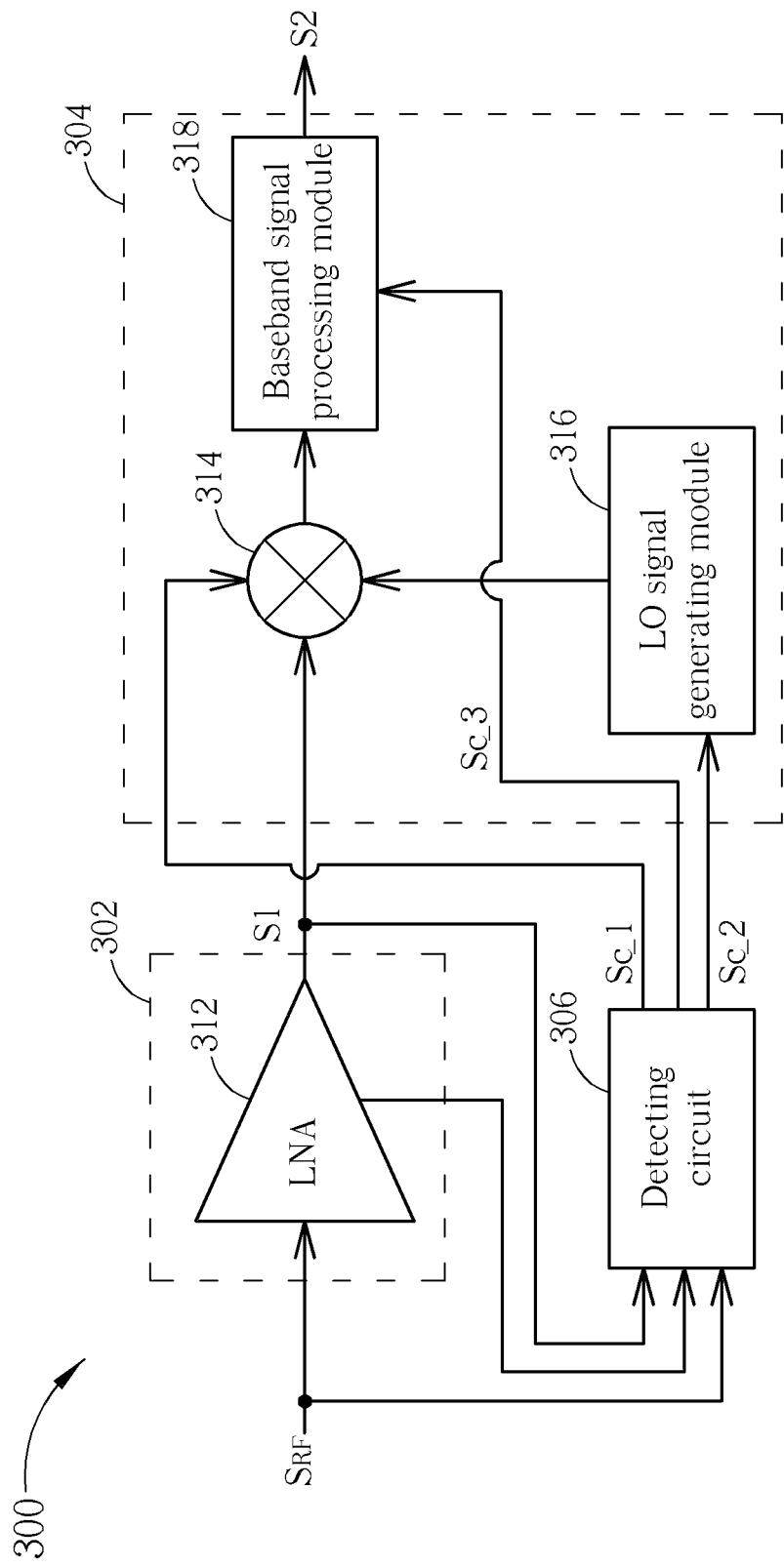
FIG. 3 is a block diagram illustrating an exemplary implementation of the wireless communication receiver shown in FIG. 1.

As shown in FIG. 3, the specific signal referred to by the detecting circuit 306 may be an input signal of the LNA 312 (i.e., the RF signal $S_{RF}$), the output signal of the LNA 312 (i.e., the first processed signal S1), or a signal indicative of a bias condition of the LNA 312. As mentioned above, the circuit behavior of the LNA 312 is affected by a blocker signal. Therefore, in addition to the input signal of the LNA 312, the output signal of the LNA 312 can give information about the signal level of the blocker signal. For another example, the existence of the large blocker signal may also increase the DC current of the LNA 312. Thus, the bias condition of the LNA 312 also gives information about the signal level of the blocker signal.

In addition, the control signal(s) generated from the detecting circuit 306 may control the mixer module 314, the LO signal generating module 316, and/or the baseband signal processing module 318. Please note that the control signal(s) may deliver any control information applicable to controlling the operation of the mixer module 314, the LO signal generating module 316, and/or the baseband signal processing module 318. That is, the type of the control signal generated from the detecting circuit 306 is not limited. In a case where the detecting circuit 306 generates the control signal $S_c\_1$ to the mixer module 314 in response to the signal level of the monitored specific signal, the mixer module 314, originally having a first operational characteristic, is configured by the control signal $S_c\_1$ to have a second operational characteristic different from the first operational characteristic such that the second signal processing circuit 304 is switched from the first operation mode to the second operation mode. By way of example, but not limitation, the first operational characteristic and the second operational characteristic of the mixer module 314 are different input impedance values, or different linearity values, or different power consumption values.

In another case where the detecting circuit 306 generates the control signal $S_c\_2$ to the LO signal generating module 316 in response to the signal level of the monitored specific signal, the LO signal generating module 316, originally having a first operational characteristic, is configured by the control signal $S_c\_2$ to have a second operational characteristic different from the first operational characteristic such that the second signal processing circuit 304 is switched from the first operation mode to the second operation mode. By way of example, but not limitation, the first operational characteristic and the second operational characteristic of the LO signal generating module 316 are different phase noise values or different power consumption values.

In yet another case where the detecting circuit 306 generates the control signal $S_{c\_3}$ to the baseband signal processing module 318 in response to the signal level of the monitored specific signal, the baseband signal processing module 318, originally having a first operational characteristic, is configured by the control signal $S_{c\_3}$ to have a second operational characteristic different from the first operational characteristic such that the second signal processing circuit 304 is switched from the first operation mode to the second operation mode. By way of example, but not limitation, the first operational characteristic and the second operational characteristic of the baseband signal processing module 318 are different linearity values or different power consumption values.

Figure 4:
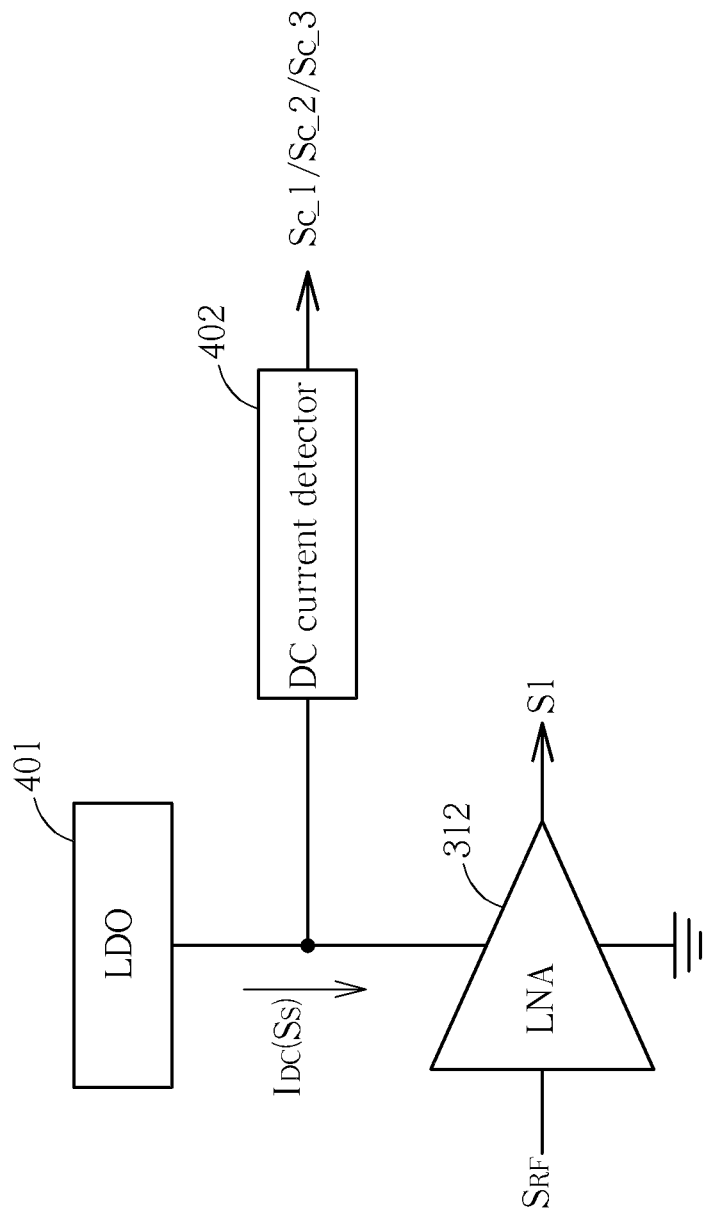
FIG. 4 is a diagram illustrating a first exemplary implementation of a detecting circuit shown in FIG. 3.
Figure 5:
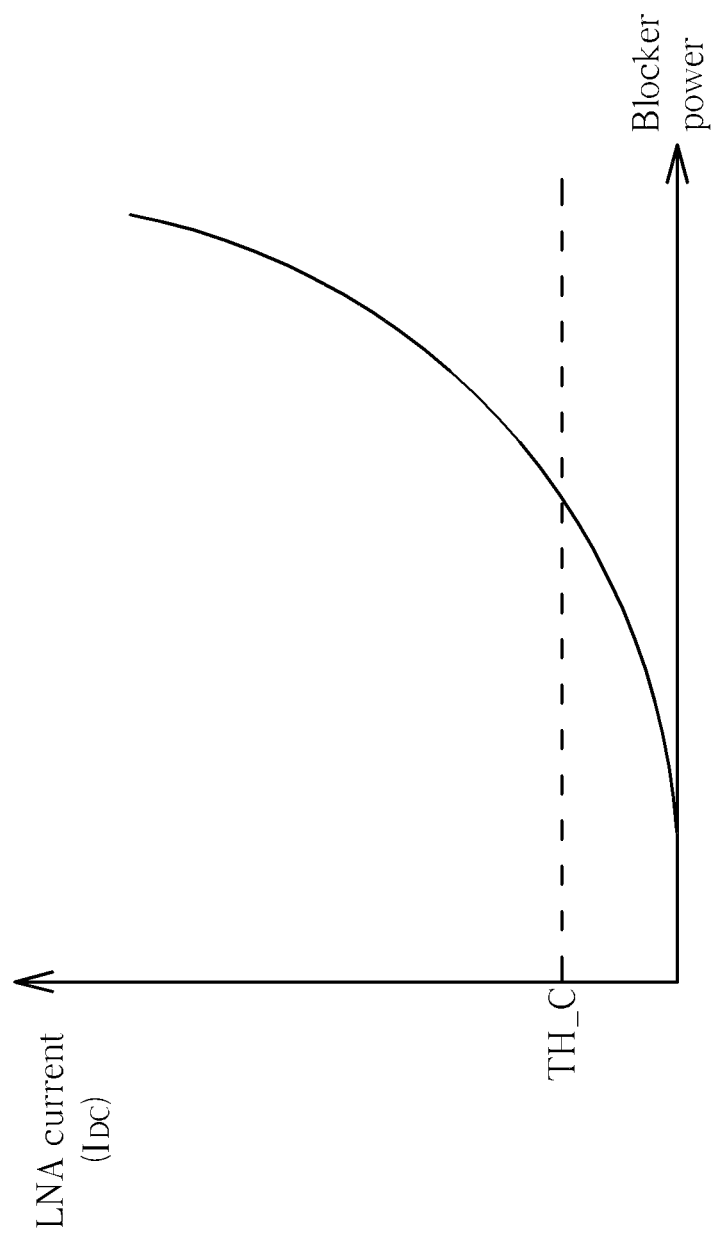
FIG. 5 is a diagram illustrating the relation between a detected LNA current and a blocker power.

Please refer to FIG. 4 in conjunction with FIG. 5. FIG. 4 is a diagram illustrating a first exemplary implementation of the detecting circuit 306 shown in FIG. 3. FIG. 5 is a diagram illustrating the relation between a detected LNA current and a blocker power. In this exemplary implementation, the detecting circuit 306 shown in FIG. 3 is realized by a DC current detector 402 implemented for detecting the DC current IDC of the LNA 312. As shown in FIG. 4, the LNA 312 is biased by a low dropout regulator (LDO) 401. However, when there is a blocker signal with larger power, the magnitude of the DC current IDC becomes larger, as shown in FIG. 5. Therefore, when the detected DC current $I_{DC}$ (i.e., the aforementioned specific signal $S_S$) is found greater than a specific current level TH_C, implying that a blocker signal with large power exists, the DC current detector 402 makes its output have a specific logic level (e.g., a high logic level "1"). When the detected DC current $I_{DC}$ is not greater than the specific current level TH_C, implying that the blocker signal with low power exists or there is no blocker signal, the output of the DC current detector 402 would have another logic level (e.g., a low logic level "0").

Figure 6:
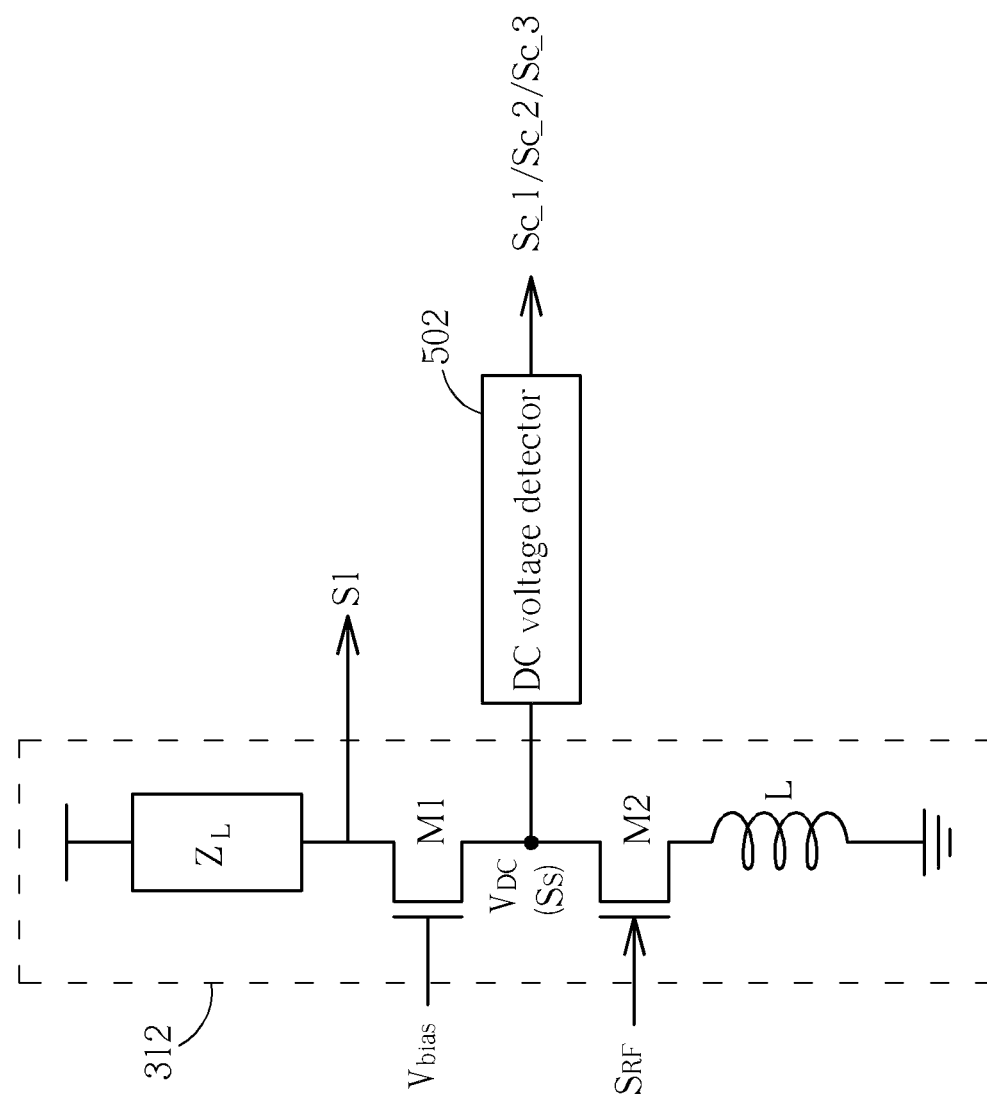
FIG. 6 is a diagram illustrating a second exemplary implementation of the detecting circuit shown in FIG. 3.
Figure 7:
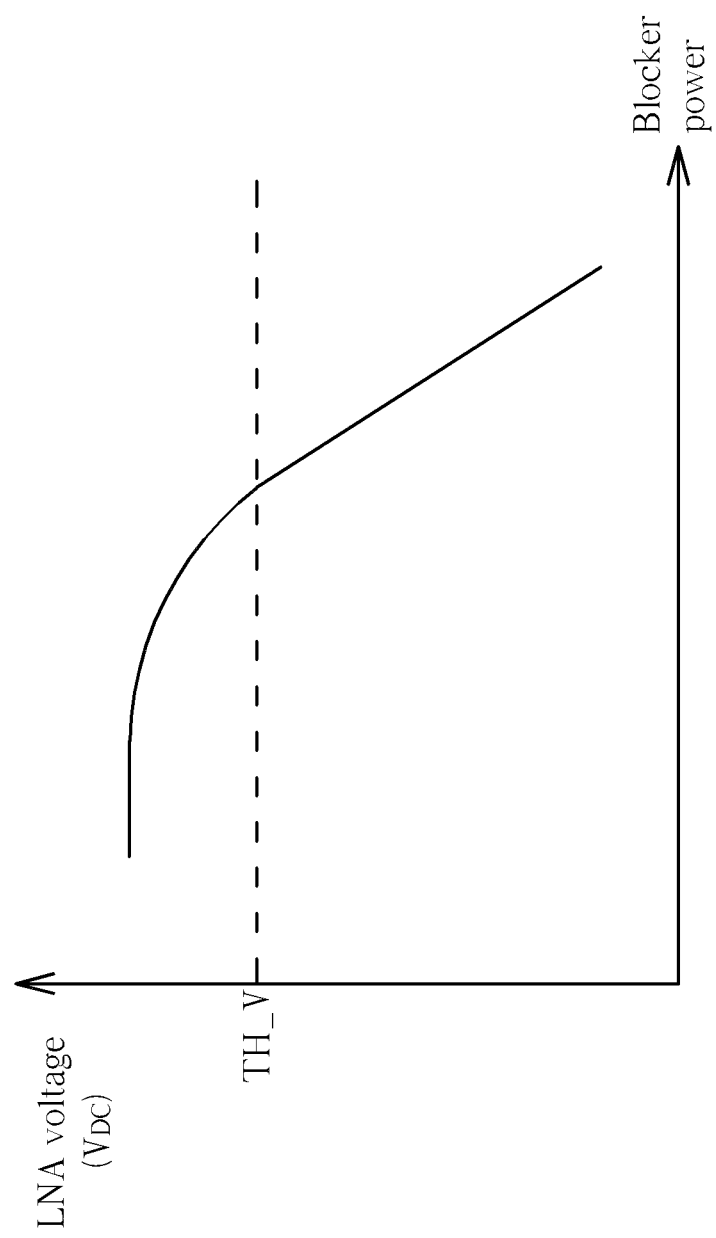
FIG. 7 is a diagram illustrating the relation between a detected LNA voltage and a blocker power.

Please refer to FIG. 6 in conjunction with FIG. 7. FIG. 6 is a diagram illustrating a second exemplary implementation of the detecting circuit 306 shown in FIG. 3. FIG. 7 is a diagram illustrating the relation between a detected LNA voltage and a blocker power. In this exemplary implementation, the detecting circuit 306 shown in FIG. 3 is realized by a DC voltage detector 502 implemented for detecting the DC voltage $V_{DC}$ (i.e., the aforementioned specific signal $S_S$) at a specific node of the LNA 312. As shown in FIG. 6, the LNA 312 includes a plurality of transistors M1 and M2, a load device $Z_L$, and an inductive element L, where a control end of the transistor M1 is biased by a bias voltage $V_{bias}$, and a control end of the transistor M2 receives the RF signal $S_{RF}$ to be processed by the LNA 312. In this exemplary implementation, the DC voltage $V_{DC}$ at the interconnection node of the transistors M1 and M2 is monitored by the DC voltage detector 502. As shown in FIG. 7, when there is a blocker signal with larger power, the voltage level of the DC voltage $V_{DC}$ becomes smaller. Therefore, when the detected DC voltage $V_{DC}$ is found smaller than a specific voltage level TH_V, implying that a blocker signal with large power exists, the DC voltage detector 502 makes its output have a specific logic level (e.g., a high logic level "1"). When the detected DC voltage $V_{DC}$ is not smaller than the specific voltage level TH_V, implying that the blocker signal with low power exists or there is no blocker signal, the output of the DC voltage detector 502 would have another logic level (e.g., a low logic level "0"). It should be noted that the amplifier architecture employed by the LNA and LNA'S DC voltage monitored by the DC voltage detector 502 are for illustrative purposes only.

In an alternative design, the DC voltage detector 502 may be arranged to monitor a DC voltage of another node within the LNA.

Figure 8:
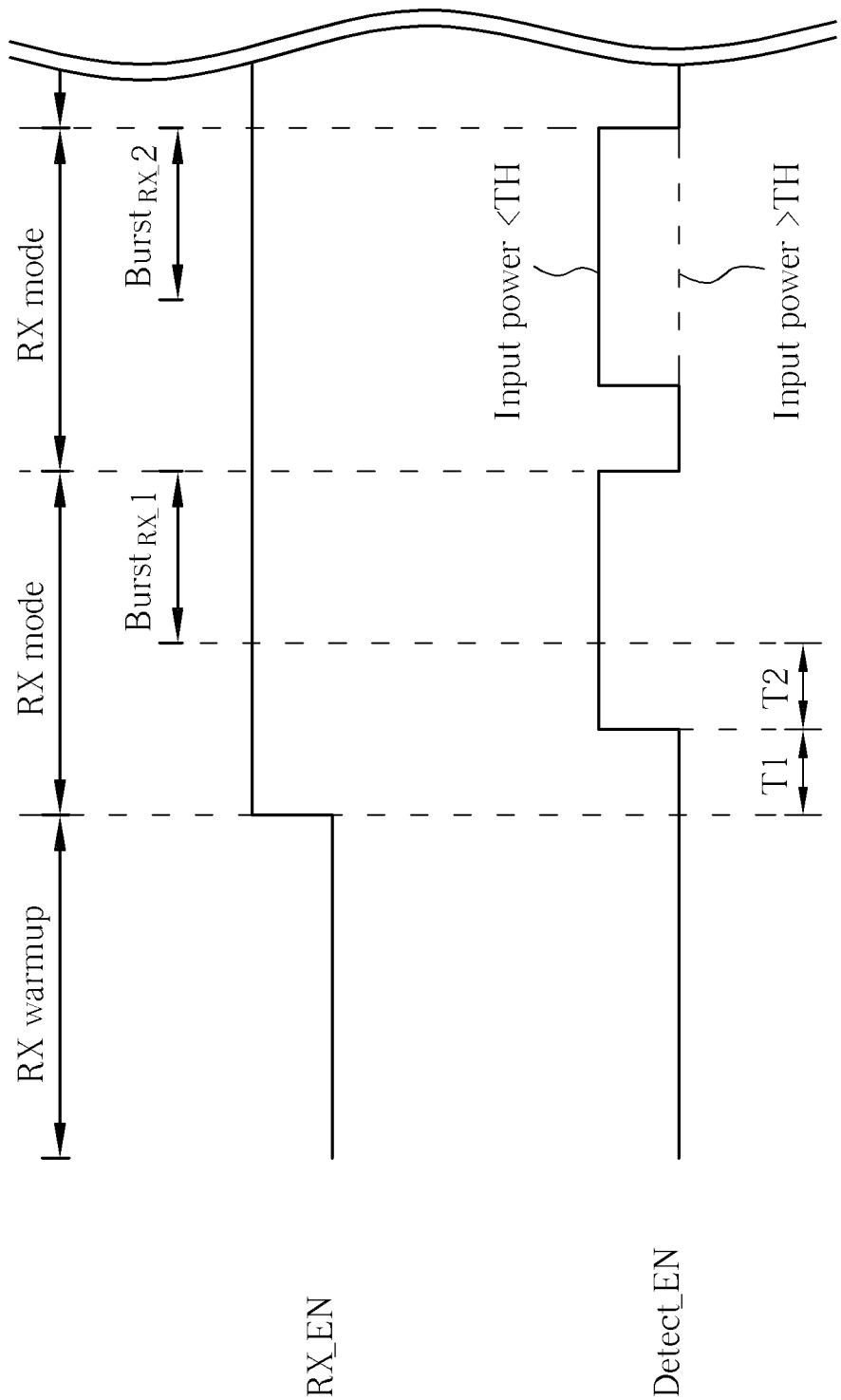
FIG. 8 is a timing diagram illustrating the operation of a wireless communication receiver used in a time-division based communication system.

FIG. 8 is a timing diagram illustrating the operation of the wireless communication receiver 300 used in a time-division based communication system. When the wireless communication receiver 300 is used in the time-division based communication system, signal bursts (e.g., $Burst_{RX\_1}$ and $Burst_{RX\_2}$) are transmitted in different time slots, respectively. It should be noted that using the wireless communication receiver 300 in the time-division based communication system is for illustrative purposes only, and is not meant to be a limitation of the present invention. That is, the wireless communication receiver 300 which employs the proposed technique for adaptively adjusting the operational mode of the second signal processing circuit 304 may also be suitable for other systems. When a receiving circuit, including the first signal processing circuit 302 and the second signal processing circuit 304, is enabled as indicated by the enabling signal RX_EN in FIG. 8, the first signal processing circuit 302 and the second signal processing circuit 304 need to be settled within the time period T1+T2, where the enabling signal Detect_EN of the detecting circuit 306 lags the enabling signal RX_EN by a time period T1 for LNA settling. For example, the time period T1+T2 is 11 us, and the time period T1 is 5 us. Therefore, there is a time period T2 of 6 us left for settling the detecting circuit 306. As can be seen from FIG. 8, the RF signal $S_{RF}$ transmits a plurality of successive signal bursts including a first signal burst $Burst_{RX\_1}$ and a second signal burst $Burst_{RX\_2}$, and the detecting circuit 306 is enabled before the first signal processing circuit 302 starts receiving the first signal burst $Burst_{RX\_1}$ and is not reset until the first signal processing circuit 102 finishes receiving the first signal burst $Burst_{RX\_1}$. As shown in FIG. 3, the second signal processing circuit 304 has the baseband signal processing module 318 included therein. In addition to generating the second processed signal S2, the baseband signal processing module 318 may determine an input power of a wanted frequency band within the first signal burst $Burst_{RX\_1}$. When the input power exceeds a predetermined threshold TH, implying that the blocker signal is insignificant, the detecting circuit 302 reset at the end of the first signal burst $Burst_{RX\_1}$ will not be enabled again before the first signal processing circuit 302 starts receiving the following second signal burst $Burst_{RX\_2}$. However, when the input power does not exceed the predetermined threshold TH, the detecting circuit 302 reset at the end of the first signal burst $Burst_{RX\_1}$ will be enabled again before the first signal processing circuit 302 starts receiving the following second signal burst $Burst_{RX\_2}$.

Figure 9:
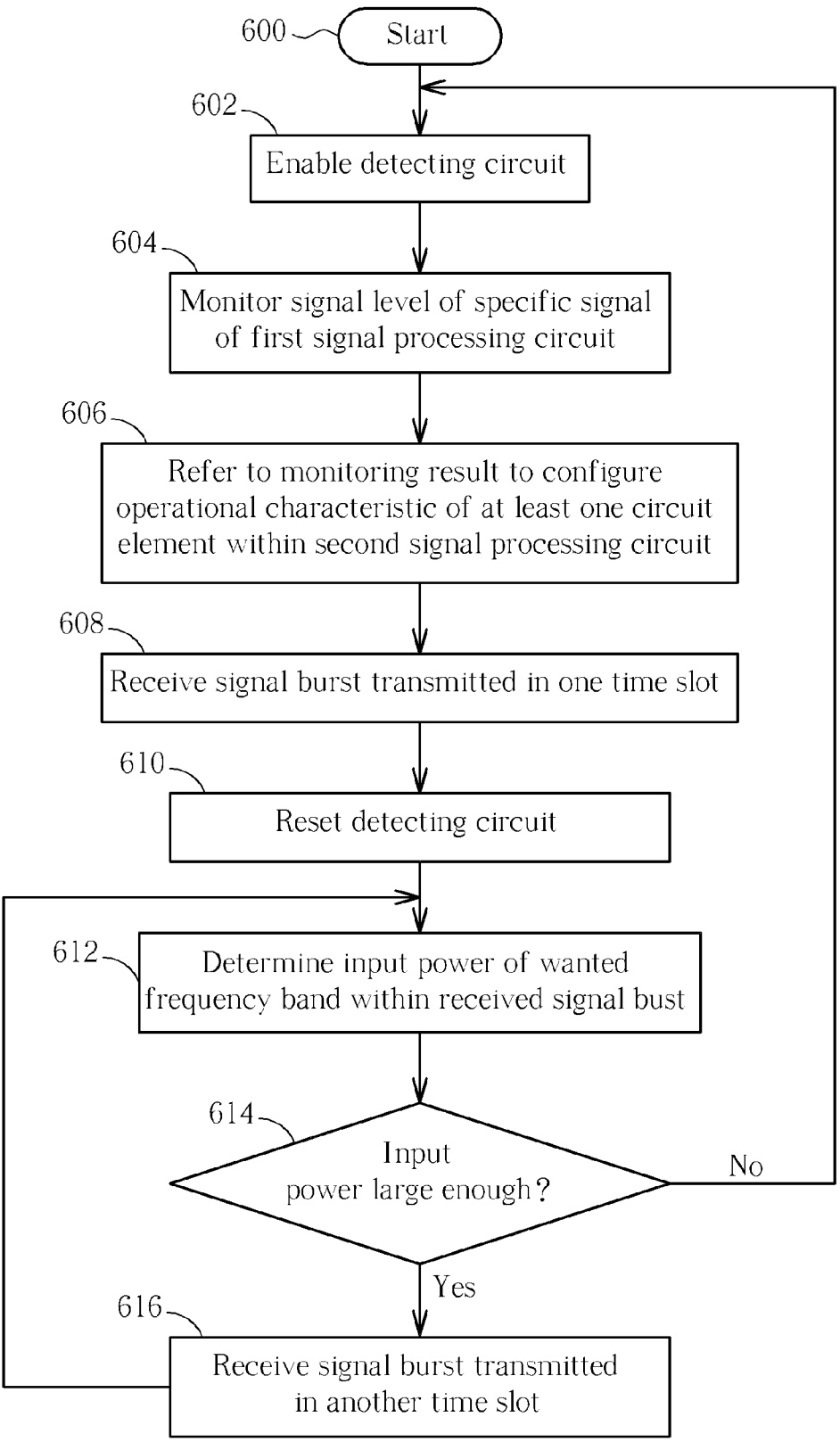
FIG. 9 is a flowchart illustrating a method of controlling a wireless communication receiver used in the time-division based communication system according to an embodiment of the present invention.

Please refer to FIG. 9, which is a flowchart illustrating a method of controlling a wireless communication receiver used in the time-division based communication system according to an embodiment of the present invention. Provided that the result is substantially the same, the steps are not required to be executed in the exact order. It should be noted that the method of controlling the wireless communication receiver used in the time-division based communication system is for illustrative purposes only, and is not meant to be a limitation of the present invention. For example, the wireless communication receiver which employs the proposed technique for adaptively adjusting the operational mode of the second signal processing circuit 304 may also be suitable for other systems. To put it simply, any method which controls the wireless communication receiver employing the proposed technique of the present invention falls within the scope of the present invention. The operation of controlling the wireless communication receiver can be briefly summarized as follows.

Step 600: Start.
Step 602: Enable the detecting circuit 106/306.
Step 604: Utilize the enabled detecting circuit 106/306 to monitor a signal level of a specific signal of the first signal processing circuit 102/302.
Step 606: Refer to the monitoring result of the signal level of the specific signal for configuring the operational characteristic of at least one circuit element within the second signal processing circuit 104/304.
Step 608: Receive a signal burst transmitted in one time slot.
Step 610: Reset the detecting circuit 106/306.
Step 612: Determine the input power of a wanted frequency band within the received signal bust.
Step 614: Check if the input power exceeds a predetermined threshold (i.e., check if the input power is large enough). If yes, go to step 616; otherwise. Go to step 602.
Step 616: Receive a signal burst transmitted in another time slot. Go to step 612.

As a person skilled in the art can readily understand operation of each step in FIG. 9 after reading paragraphs directed to aforementioned embodiments, further description is omitted here for brevity.

Figure 10A:
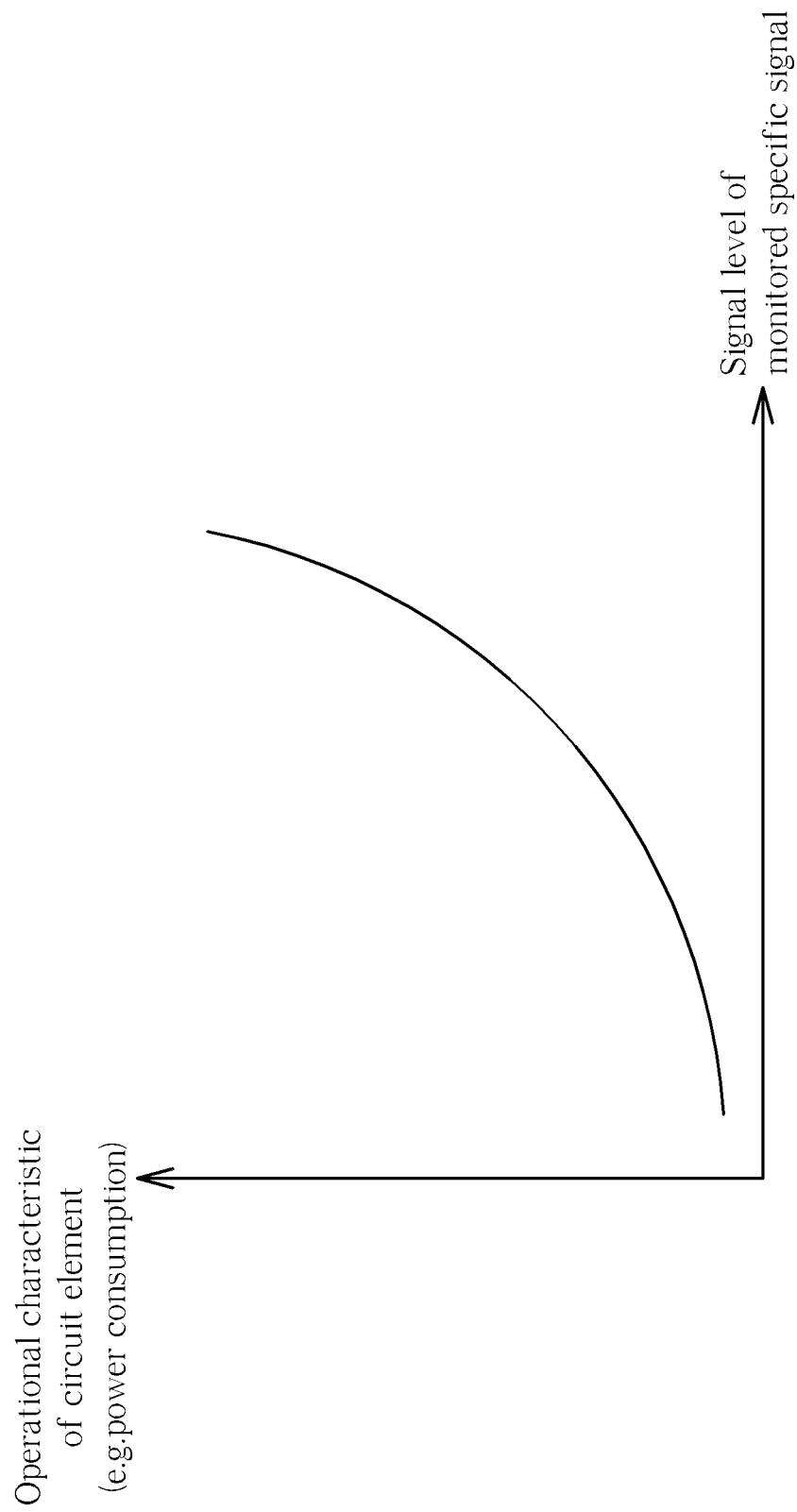
FIG. 10A is a diagram illustrating a smooth transfer function of mapping a signal level of a monitored specific signal of a first signal processing circuit to a configured operational characteristic of at least one circuit element within the second signal processing circuit.
Figure 10B:
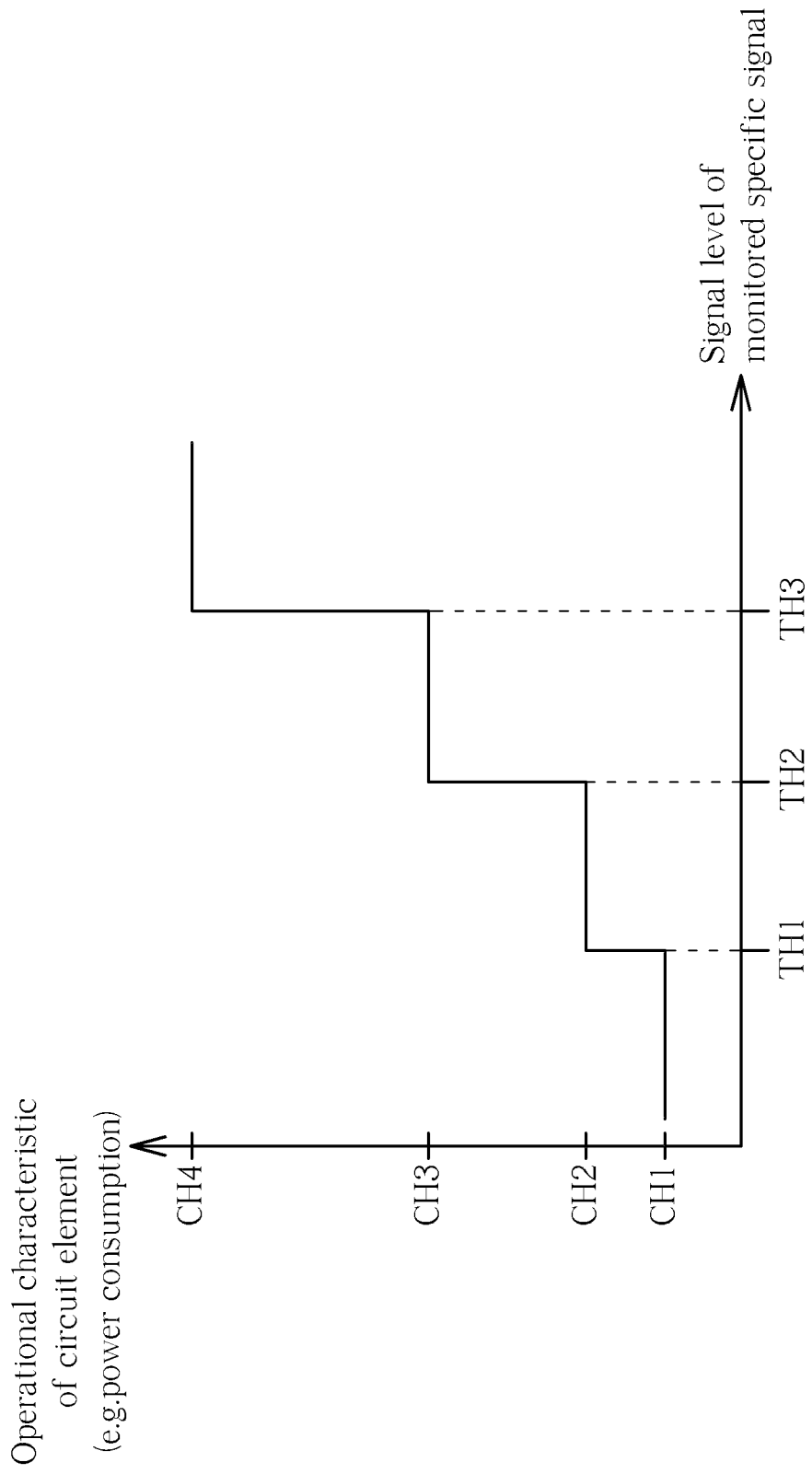
FIG. 10B is a diagram illustrating a first piece-wise transfer function of mapping a signal level of a monitored specific signal of a first signal processing circuit to a configured operational characteristic of at least one circuit element within the second signal processing circuit.
Figure 11:
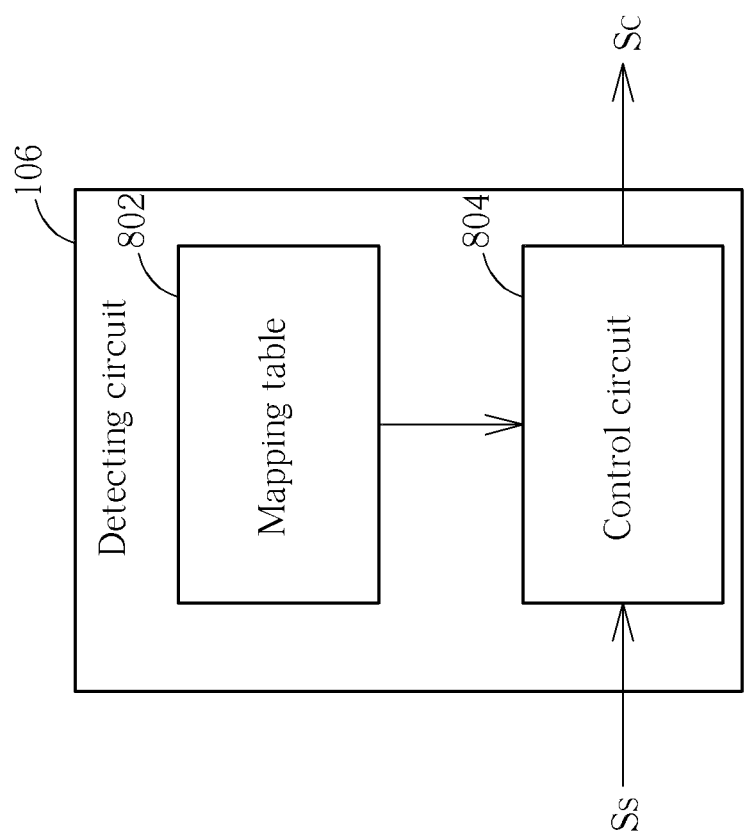
FIG. 11 is a diagram illustrating an exemplary implementation of the detecting circuit shown in FIG. 1.

In step 606, the detecting circuit 106/306 refers to the monitoring result of the signal level of the specific signal for configuring the operational characteristic of at least one circuit element within the second signal processing circuit 104/304. For example, the power consumption of the overall receiving circuit is adjusted by changing the operational characteristic of at least one circuit element within the second signal processing circuit 104/304. The signal level of the monitored specific signal of the first signal processing circuit 102/302 and the configured operational characteristic of at least one circuit element within the second signal processing circuit 104/304 may have a smooth transfer function as shown in FIG. 10A or a piece-wise transfer function as shown in FIG. 10B or FIG. 10C. As can be seen from FIG. 10A, each signal level of the monitored specific signal of the first signal processing circuit 102/302 is mapped to a corresponding configured operational characteristic of at least one circuit element within the second signal processing circuit 104/304. In a case where the smooth transfer function is employed by the detecting circuit 106/306, a pre-built mapping table is an example to determine the control signal. Please refer to FIG. 11, which is a diagram illustrating an exemplary implementation of the detecting circuit 106 shown in FIG. 1. The detecting circuit 106 includes a mapping table 802 and a control unit 804. In this exemplary implementation, the mapping table 802 is arranged to record a plurality of operation mode settings of the second signal processing circuit 104 (e.g., a plurality of operational characteristic settings of at least one circuit element within the second signal processing circuit 104) mapped to a plurality of signal levels of the monitored specific signal $S_S$, respectively. The control unit 804 is arranged to detect the signal level of the monitored specific signal $S_S$, search the mapping table 802 for a target operation mode setting (e.g., a target operational characteristic setting of at least one circuit element within the second signal processing circuit 104) corresponding to the detected signal level of the monitored specific signal $S_S$, and generate the control signal $S_C$ in response to the target operation mode setting (e.g., the target operational characteristic setting of at least one circuit element within the second signal processing circuit 104). In this way, the second signal processing circuit 104 may have different power consumption values under different operation modes. Therefore, as the power consumption of the second signal processing circuit 104 can be adaptively adjusted, the average power consumption of the wireless communication receiver 100, compared to that of the conventional receiver design, can be effectively reduced.

As shown in FIG. 10B, when the detected signal level of the monitored specific signal $S_S$ is lower than a first predetermined level TH1, at least one circuit element within the second signal processing circuit 104 is configured to have a first operational characteristic CH1 to thereby make the second signal processing circuit 104 operate under a first operation mode; when the detected signal level of the monitored specific signal $S_S$ is between the first predetermined level TH1 and a second predetermined level TH2, at least one circuit element within the second signal processing circuit 104 is configured by the control signal $S_C$ to have a second operational characteristic CH2 to thereby make the second signal processing circuit 104 operate under a second operation mode; when the detected signal level of the monitored specific signal $S_S$ is between the second predetermined level TH2 and a third predetermined level TH3, at least one circuit element within the second signal processing circuit 104 is configured by the control signal $S_C$ to have a third operational characteristic CH3 to thereby make the second signal processing circuit 104 operate under a third operation mode; and when the detected signal level of the monitored specific signal $S_S$ exceeds the third predetermined level TH3, at least one circuit element within the second signal processing circuit 104 is configured by the control signal $S_C$ to have a fourth operational characteristic CH4 to thereby make the second signal processing circuit 104 operate under a fourth operation mode. Similarly, as the power consumption of the second signal processing circuit 104 can be adaptively adjusted, the average power consumption of the wireless communication receiver 100, compared to that of the conventional receiver design, can be effectively reduced.

FIG. 10C shows a simplified piece-wise transfer function employed by the detecting circuit 106. Thus, the detecting circuit 106 refers to the specific signal $S_S$ of the first signal processing circuit 102 for detecting if a blocker signal exists, and generate at least a control signal $S_C$ to the second signal processing circuit 104 in response to a detecting result indicative of the existence of the blocker signal. For example, when the detected signal level of the monitored specific signal $S_S$ exceeds the predetermined level TH', the detecting circuit 106 determines that there is a large blocker signal beside a small wanted signal. Therefore, the control signal $S_C$ generated from the detecting circuit 106 controls at least one circuit element within the second signal processing circuit 104 to have a change from a first operational characteristic CH1' to a second operational characteristic CH2', thereby making the second signal processing circuit 104 have a transition from a first operation mode to a second operation mode. Similarly, as the power consumption of the second signal processing circuit 104 can be adaptively adjusted, the average power consumption of the wireless communication receiver 100, compared to that of the conventional receiver design, can be effectively reduced.

The wireless communication receiver 300 may operate according to the transfer function shown in FIG. 10A/FIG. 10B/FIG. 10C in a time-division based communication system; however, this is for illustrative purposes only, and is not meant to be a limitation of the present invention. That is, the wireless communication receiver 300 may operate according to the transfer function shown in FIG. 10A/FIG. 10B/FIG. 10C in other systems. This also obeys the spirit of the present invention.

It should be noted that when either of the above-mentioned piece-wise transfer functions and the smooth transfer function is employed by the detecting circuit 106/306, a pre-built mapping table may also be used to determine the control signal. Thus, the detecting circuit may be implemented using the circuit structure shown in FIG. 11. However, this is for illustrative purposes only, and is not meant to be a limitation of the present invention. For example, the detecting circuit 106/306 may be equipped with sufficient computing power for directly calculating the control value and then generating the control signal in response to the detected signal level of the monitored specific signal.

Figure 12:
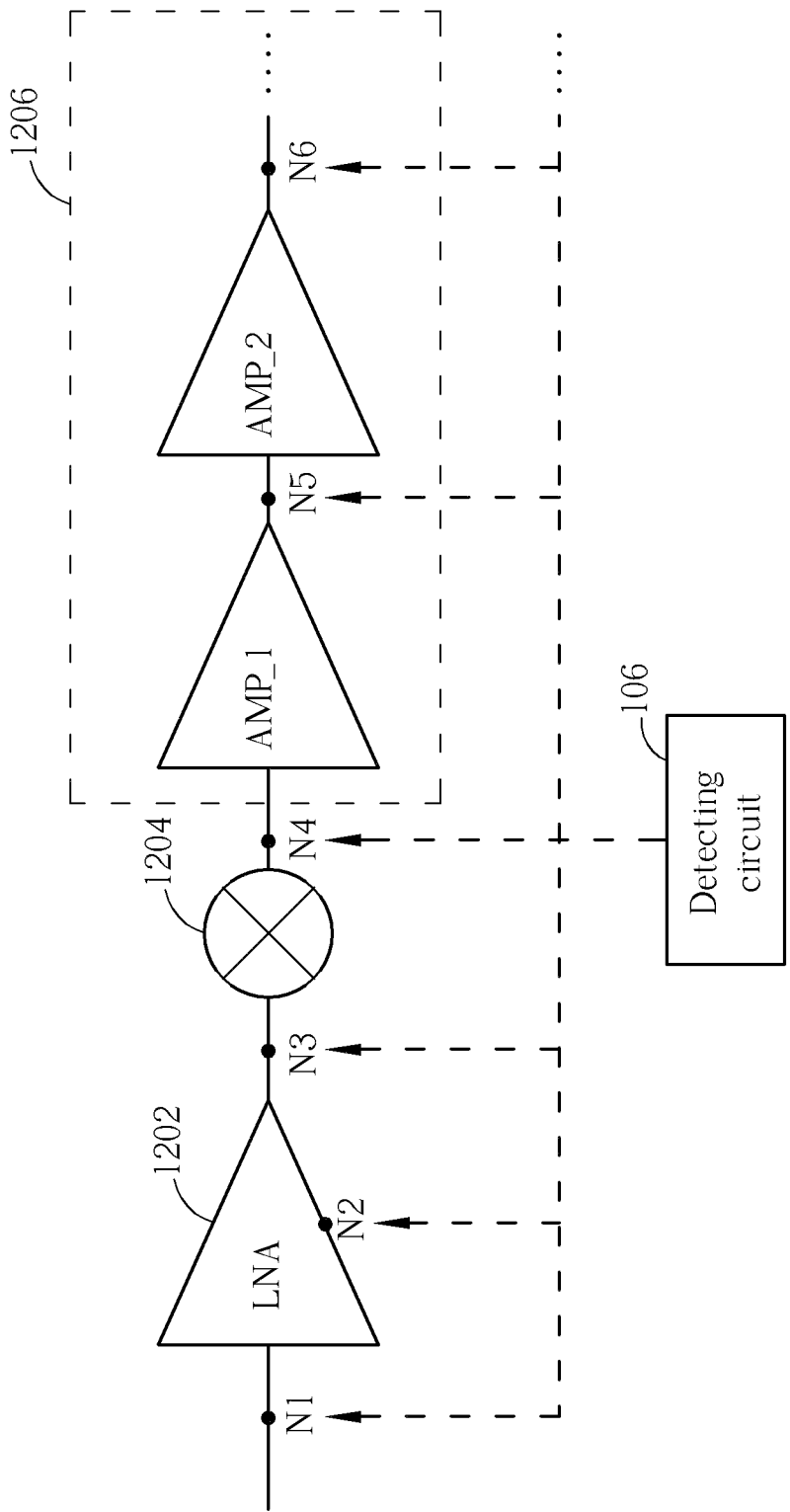
FIG. 12 is a diagram illustrating possible connections between a receiving circuit and a detection circuit.

Moreover, the connection between the receiving circuit, including the first signal processing circuit 302 and the second signal processing circuit 304, and the detection circuit shown in FIG. 3 is for illustrative purposes only. That is, regarding a receiving circuit composed of the first signal processing circuit 102 and the second signal processing circuit 104, a connection node in such receiving circuit to which the detection circuit 106 is connected can be set according to the actual configuration of the first signal processing circuit 102. Suppose that an exemplary receiving circuit includes an LNA 1202, a mixer 1204, and a baseband signal processing module having at least an amplifier chain 1206 including a plurality of amplifiers (e.g., AMP_1 and AMP_2) connected in series, as shown in FIG. 12. In a first case where the last-stage circuit element of the first signal processing circuit 102 is the LNA 1202, the detecting circuit 106 may be connected to one of the nodes N1-N3. In a second case where the last-stage circuit element of the first signal processing circuit 102 is the mixer 1204, the detecting circuit 106 may be connected to one of the nodes N1-N4. In a third case where the last-stage circuit element of the first signal processing circuit 102 is the amplifier AMP_1, the detecting circuit 106 may be connected to one of the nodes N1-N5. In a fourth case where the last-stage circuit element of the first signal processing circuit 102 is the amplifier AMP_2, the detecting circuit 106 may be connected to one of the nodes N1-N6. To put it simply, any receiver design employing the exemplary structure shown in FIG. 1 obeys the spirit of the present invention and falls within the scope of the present invention.

Figure 13:
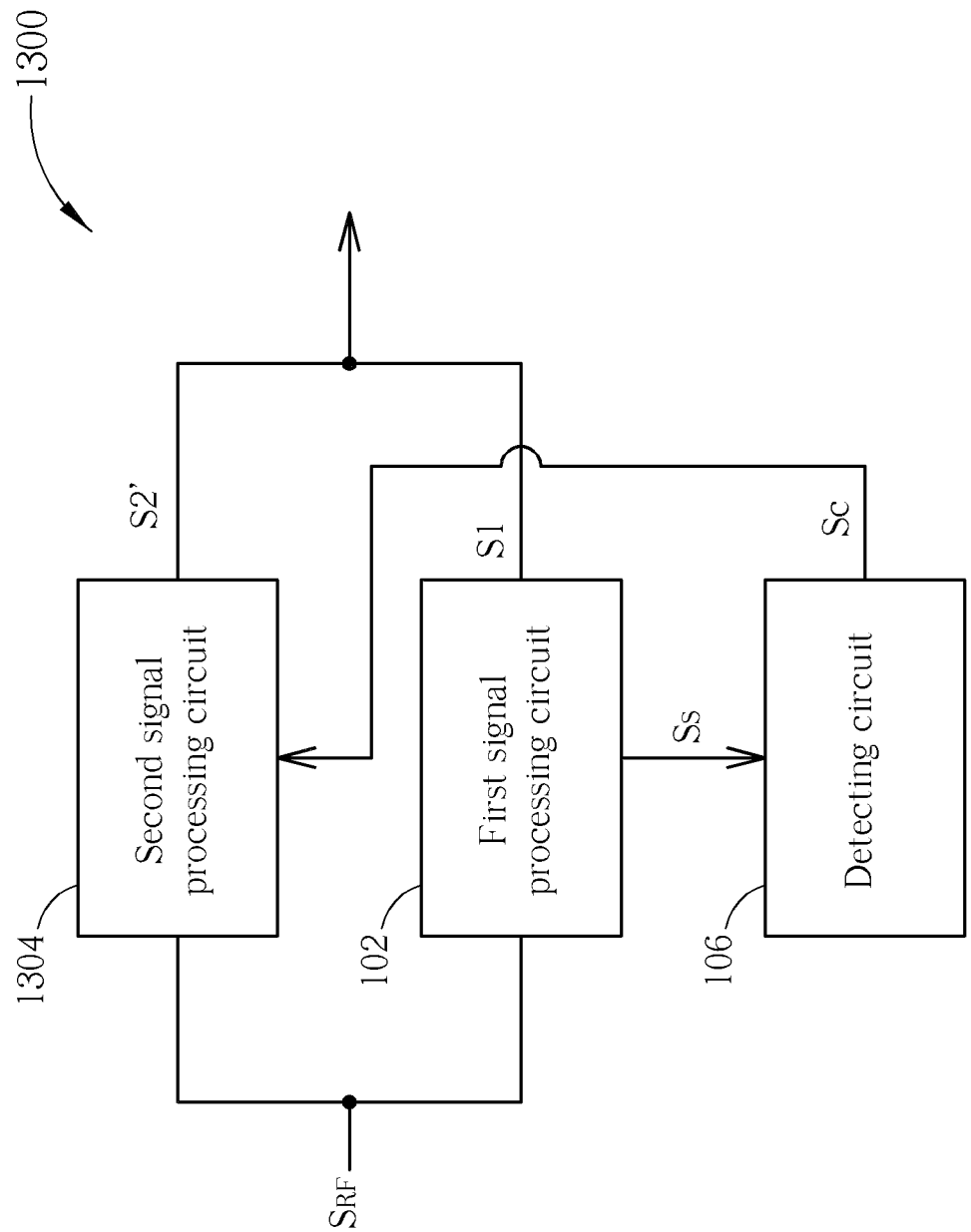
FIG. 13 is a block diagram illustrating a generalized wireless communication receiver according to another exemplary embodiment of the present invention.

FIG. 13 is a block diagram illustrating a generalized wireless communication receiver according to another exemplary embodiment of the present invention. The exemplary wireless communication receiver 1300 includes the aforementioned first signal processing circuit 102 and detecting circuit 106, and a second signal processing circuit 1304 coupled to the first signal processing circuit 102 in parallel. In this exemplary embodiment, the second signal processing circuit 1304 is arranged to receive the RF signal $S_{RF}$ and generate a second processed signal S2' by processing the received RF signal $S_{RF}$, where the frequency of $S_{RF}$ and S2' can be the same or different. The detecting circuit 106 is arranged to monitor the specific signal $S_S$ of the first signal processing circuit 102 and generate a control signal $S_C$ to the second signal processing circuit 1304 in response to a signal level/power level of the monitored specific signal $S_S$. Please note that the control signal $S_C$ may deliver any control information applicable to controlling the operation of the second signal processing circuit 1304. That is, the type of the control signal $S_C$ is not limited. The control signal $S_c$ generated from the detecting circuit 106 controls the second signal processing circuit 1304 to switch from one operation mode to another operation mode when the detecting circuit 106 determines that the signal level of the monitored specific signal $S_S$ meets a criterion. Therefore, based on the signal level of the monitored specific signal $S_S$ of the first signal processing circuit 102, the second signal processing circuit 1304 which is coupled to the first signal processing circuit 102 in parallel is adaptively adjusted to change its operation mode. For example, monitoring the specific signal $S_S$ of the first signal processing circuit 102 is to monitor the existence of a large blocker signal. Thus, when it is determined that the signal level of the monitored specific signal $S_S$ has reached the predetermined level, the existence of the undesired blocker signal is acknowledged by the detecting circuit 106. Next, the detecting circuit 106 makes the second signal processing circuit 1304 operating under a first operation mode (e.g., an inactive mode) to enter a second operation mode (e.g., an active mode), where the second signal processing circuit 1304 operating under the second operation mode would have better linearity performance. In this way, the undesired affects resulted from the large blocker signal may be mitigated. It should be noted that the wireless communication receiver 1300 may be used in all kinds of systems, including a time-division based communication system.

Figure 14:
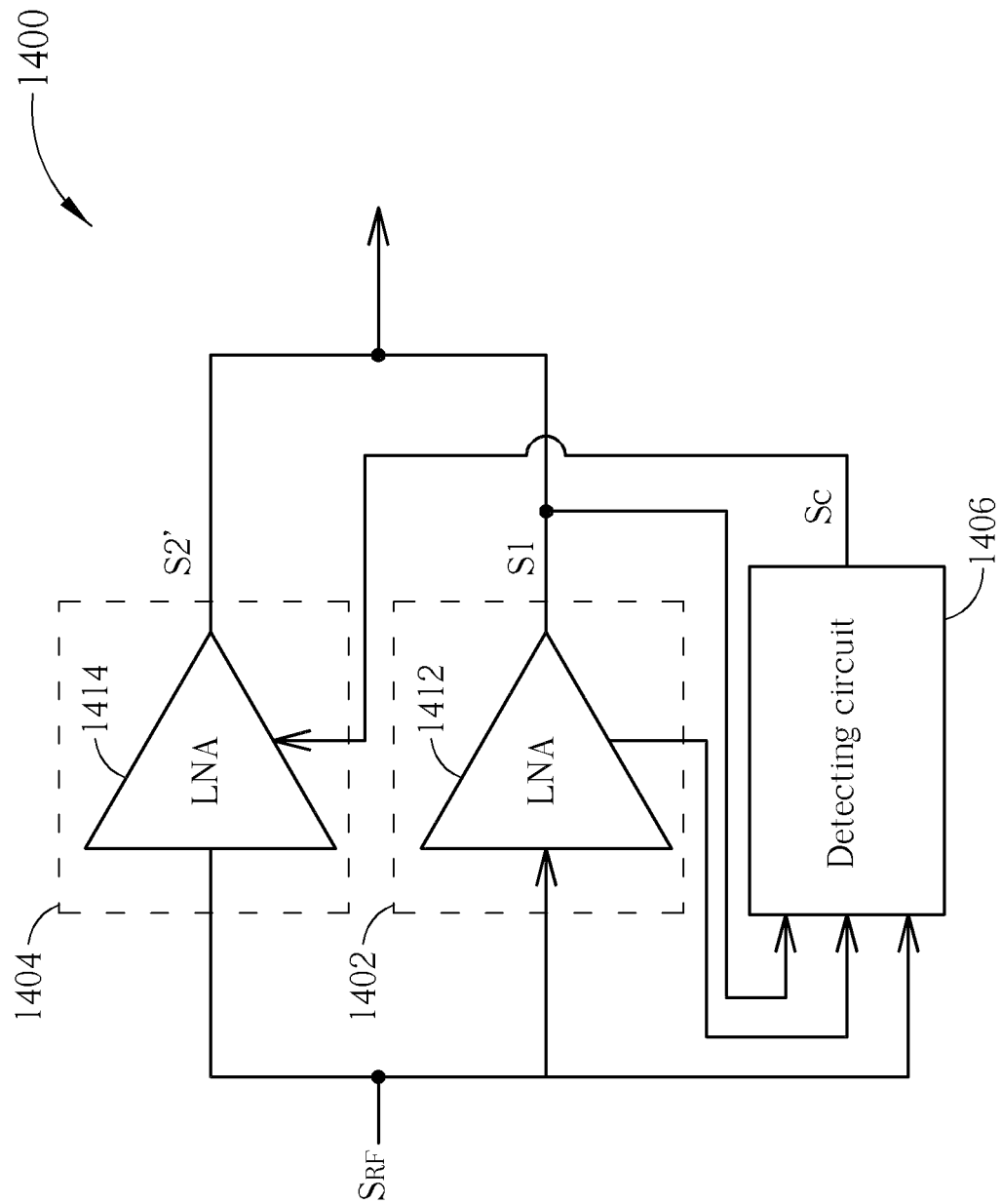
FIG. 14 is a block diagram illustrating an exemplary implementation of the wireless communication receiver shown in FIG. 13.

Please refer to FIG. 14, which is a block diagram illustrating an exemplary implementation of the wireless communication receiver 1300 shown in FIG. 13. The exemplary wireless communication receiver 1400 is based on the circuit structure shown in FIG. 13, and therefore has a first signal processing circuit 1402, a second signal processing circuit 1404, and a detecting circuit 1406, where the first signal processing circuit 1402 includes an LNA 1412, and the second signal processing circuit 1404 includes an LNA 1414. However, this is for illustrative purposes only. That is, the first signal processing circuit 1402 and/or the second signal processing circuit 1404 may include additional circuit elements.

As shown in FIG. 14, the specific signal referred to by the detecting circuit 1406 may be an input signal of the LNA 1412 (i.e., the RF signal $S_{RF}$), the output signal of the LNA 1412 (i.e., the first processed signal S1), or a signal indicative of a bias condition of the LNA 1412. As mentioned above, the circuit behavior of the LNA 1412 is affected by a blocker signal. Therefore, in addition to the input signal of the LNA 1412, the output signal of the LNA 1412 can give information about the signal level of the blocker signal. For another example, the existence of the large blocker signal may also increase the DC current of the LNA 1412. Thus, the bias condition of the LNA 1412 also gives information about the signal level of the blocker signal.

In this exemplary implementation, the LNA 1412 is configured to have lower power consumption/good noise performance, while the LNA 1414 is configured to have higher power consumption/better linearity performance. The control signal $S_c$ generated from the detecting circuit 1406 may control the LNA 1414. In a case where the detecting circuit 1406 generates the control signal $S_c$ to the LNA 1414 in response to the signal level of the monitored specific signal, the LNA 1414, originally having a first operational characteristic, is configured by the control signal $S_C$ to have a second operational characteristic different from the first operational characteristic such that the second signal processing circuit 1404 is switched from the first operation mode to the second operation mode. By way of example, but not limitation, the LNA 1414 is regarded as having the first operational characteristic when turned off, and the LNA 1414 is regarded as having the second operational characteristic when turned on. Therefore, when the detecting circuit 1406 detects that the circuit behavior of the LNA 1412 is affected by a blocker signal, the LNA 1414 which is coupled to the LNA 1412 in parallel and has better linearity performance will be turned on to improve the signal quality.

Figure 15:
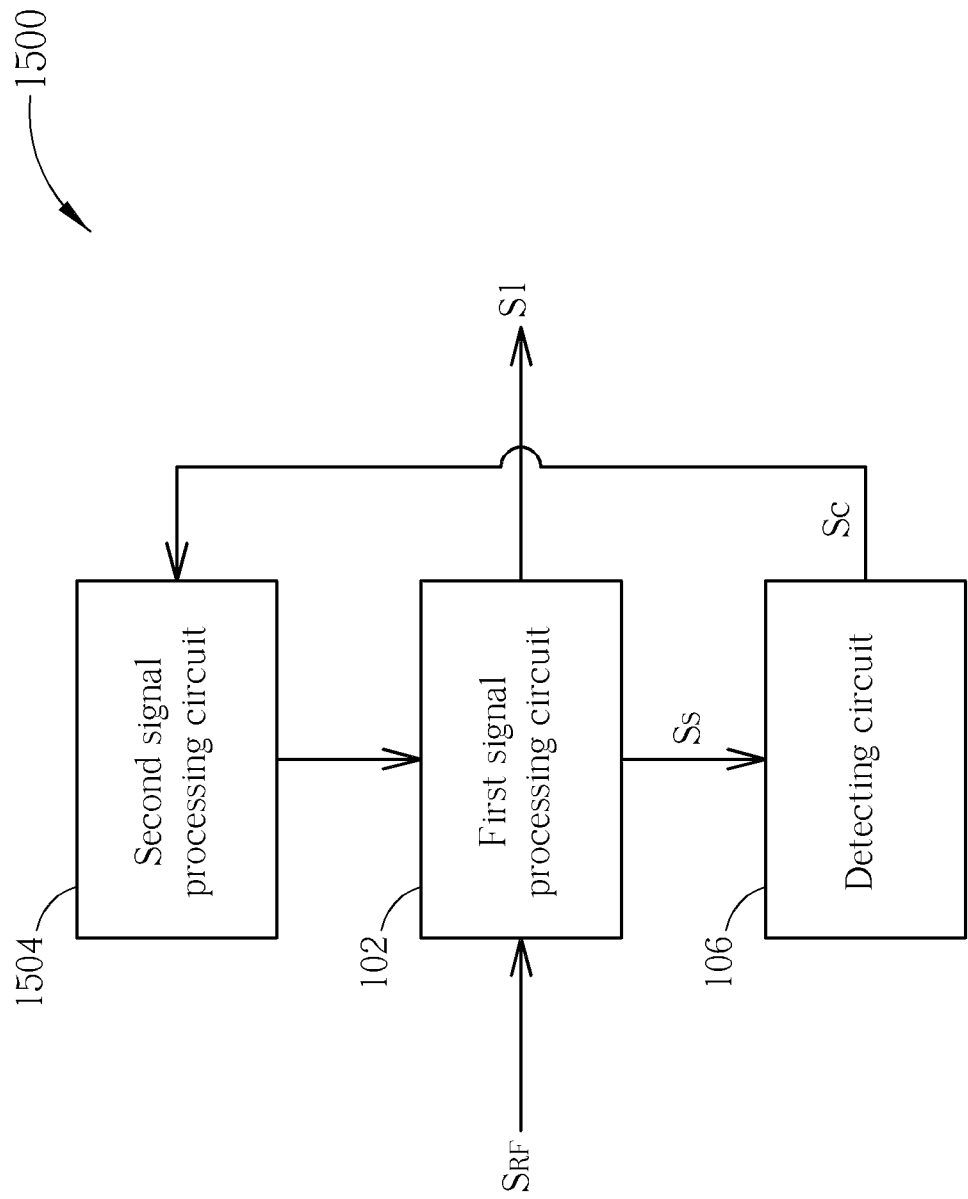
FIG. 15 is a block diagram illustrating a generalized wireless communication receiver according to yet another exemplary embodiment of the present invention.

FIG. 15 is a block diagram illustrating a generalized wireless communication receiver according to yet another exemplary embodiment of the present invention. The exemplary wireless communication receiver 1500 includes the aforementioned first signal processing circuit 102 and detecting circuit 106, and a second signal processing circuit 1504 coupled to the first signal processing circuit 102. In this exemplary embodiment, the second signal processing circuit 1504 is arranged to control the operation of the first signal processing circuit 102. The detecting circuit 106 is arranged to monitor the specific signal $S_S$ of the first signal processing circuit 102 and generate a control signal $S_C$ to the second signal processing circuit 1504 in response to a signal level/power level of the monitored specific signal $S_S$. Please note that the control signal $S_C$ may deliver any control information applicable to controlling the operation of the second signal processing circuit 1504. That is, the type of the control signal $S_C$ is not limited. The control signal $S_c$ generated from the detecting circuit 106 controls the second signal processing circuit 1504 to switch from one operation mode to another operation mode when the detecting circuit 106 determines that the signal level of the monitored specific signal $S_S$ meets a criterion. Therefore, based on the signal level of the monitored specific signal $S_S$ of the first signal processing circuit 102, the second signal processing circuit 1504 which controls the operation of the first signal processing circuit 102 is adaptively adjusted to change its operation mode. For example, monitoring the specific signal $S_S$ of the first signal processing circuit 102 is to monitor the existence of a large blocker signal. Thus, when it is determined that the signal level of the monitored specific signal $S_S$ has reached the predetermined level, the existence of the undesired blocker signal is acknowledged by the detecting circuit 106. Next, the detecting circuit 106 makes the second signal processing circuit 1504 operating under a first operation mode (e.g., a first bias mode) to enter a second operation mode (e.g., a second bias mode), where the second signal processing circuit 1504 operating under the second operation mode would make the first signal processing circuit 102 have better linearity performance. In this way, the undesired affects resulted from the large blocker signal may be mitigated. It should be noted that the wireless communication receiver 1500 may be used in all kinds of systems, including a time-division based communication system.

Figure 16:
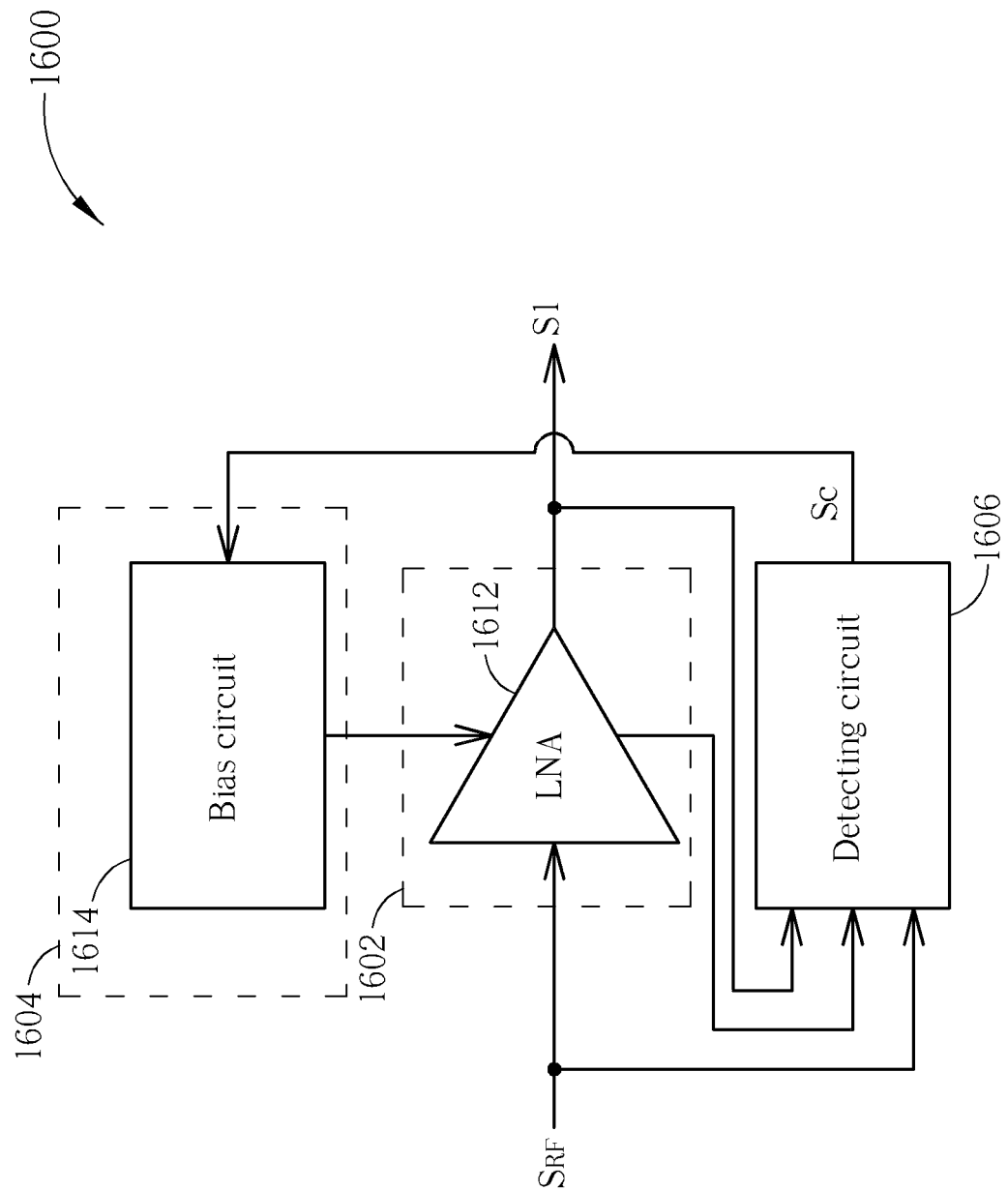
FIG. 16 is a block diagram illustrating an exemplary implementation of the wireless communication receiver shown in FIG. 15.

Please refer to FIG. 16, which is a block diagram illustrating an exemplary implementation of the wireless communication receiver 1500 shown in FIG. 15. The exemplary wireless communication receiver 1600 is based on the circuit structure shown in FIG. 15, and therefore has a first signal processing circuit 1602, a second signal processing circuit 1604, and a detecting circuit 1606, where the first signal processing circuit 1602 includes an LNA 1612, and the second signal processing circuit 1604 includes a bias circuit 1614. However, this is for illustrative purposes only. That is, the first signal processing circuit 1602 and/or the second signal processing circuit 1604 may include additional circuit elements.

As shown in FIG. 16, the specific signal referred to by the detecting circuit 1606 may be an input signal of the LNA 1612 (i.e., the RF signal $S_{RF}$), the output signal of the LNA 1612 (i.e., the first processed signal S1), or a signal indicative of a bias condition of the LNA 1612. As mentioned above, the circuit behavior of the LNA 1612 is affected by a blocker signal. Therefore, in addition to the input signal of the LNA 1612, the output signal of the LNA 1612 can give information about the signal level of the blocker signal. For another example, the existence of the large blocker signal may also increase the DC current of the LNA 1612. Thus, the bias condition of the LNA 1612 also gives information about the signal level of the blocker signal.

In this exemplary implementation, the bias circuit 1614 of the second signal processing circuit 1604 may be an LDO, a DC voltage control circuit, or a DC current control circuit, and is implemented for biasing the LNA 1612 of the first signal processing circuit 1602. The control signal $S_c$ generated from the detecting circuit 1606 may control the bias circuit 1614. In a case where the detecting circuit 1606 generates the control signal $S_c$ to the bias circuit 1614 in response to the signal level of the monitored specific signal, the bias circuit 1614, originally having a first operational characteristic, is configured by the control signal $S_c$ to have a second operational characteristic different from the first operational characteristic such that the second signal processing circuit 1604 is switched from the first operation mode to the second operation mode. By way of example, but not limitation, the first operational characteristic and the second operational characteristic are different current/voltage headroom settings. Therefore, when the detecting circuit 1606 detects that the circuit behavior of the LNA 1612 is affected by a blocker signal, the bias circuit 1614 is triggered by the control signal $S_c$ to provide more current/voltage headroom to the LNA 1612 of the first signal processing circuit 1602 for better linearity performance. In this way, the signal quality is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication receiver, comprising:
a first signal processing circuit, arranged to receive a radio frequency (RF) signal, and generate a first processed signal by processing the received RF signal;
a second signal processing circuit, coupled to the first signal processing circuit; and
a detecting circuit, arranged to monitor a specific signal of the first signal processing circuit and generate at least a control signal to the second signal processing circuit in response to a voltage level or a current level of the monitored specific signal, wherein the control signal controls the second signal processing circuit to switch from a first operation mode to a second operation mode when the detecting circuit determines that the voltage level or the current level of the monitored specific signal meets a criterion.

2. The wireless communication receiver of claim 1, wherein a circuit behavior of the first signal processing circuit is affected by a blocker signal.

3. The wireless communication receiver of claim 1, wherein the first signal processing circuit includes a low-noise amplifier (LNA), and the specific signal is an input signal fed into the LNA, an output signal generated from the LNA, or indicative of a bias condition of the LNA.

4. The wireless communication receiver of claim 1, wherein the control signal controls the second signal processing circuit to switch from the first operation mode to the second operation mode by making at least one circuit element in the second signal processing circuit have a change in its operational characteristic.

5. The wireless communication receiver of claim 1, wherein the second signal processing circuit includes a mixer module having a first operational characteristic; and the mixer module is configured by the control signal to have a second operational characteristic different from the first operational characteristic such that the second signal processing circuit is switched from the first operation mode to the second operation mode.

6. The wireless communication receiver of claim 5, wherein the first operational characteristic and the second operational characteristic are different input impedance values, or different linearity values, or different power consumption values.

7. The wireless communication receiver of claim 1, wherein the second signal processing circuit includes a local oscillator (LO) signal generating module having a first operational characteristic; and the LO signal generating module is configured by the control signal to have a second operational characteristic different from the first operational characteristic such that the second signal processing circuit is switched from the first operation mode to the second operation mode.

8. The wireless communication receiver of claim 7, wherein the first operational characteristic and the second operational characteristic are different phase noise values or different power consumption values.

9. The wireless communication receiver of claim 1, wherein the second signal processing circuit includes a baseband signal processing module having a first operational characteristic; and the baseband signal processing module is configured by the control signal to have a second operational characteristic different from the first operational characteristic such that the second signal processing circuit is switched from the first operation mode to the second operation mode.

10. The wireless communication receiver of claim 9, wherein the first operational characteristic and the second operational characteristic are different linearity values or different power consumption values.

11. The wireless communication receiver of claim 1, wherein the RF signal transmits a plurality of signal bursts including a first signal burst, and the detecting circuit is enabled before the first signal processing circuit starts receiving the first signal burst and is not reset until the first signal processing circuit finishes receiving the first signal burst.

12. The wireless communication receiver of claim 11, wherein when an input power of a wanted frequency band within the first signal burst exceeds a predetermined threshold, the detecting circuit reset at an end of the first signal burst is not enabled before the first signal processing circuit starts receiving a second signal burst following the first signal burst.

13. The wireless communication receiver of claim 1, wherein the detecting circuit comprises:
a mapping table, arranged to record a plurality of operation mode settings of the second signal processing circuit mapped to a plurality of voltage levels or current levels of the monitored specific signal, respectively; and
a control unit, arranged to detect the voltage level or the current level of the monitored specific signal, search the mapping table for a target operation mode setting corresponding to the detected voltage level or detected current level of the monitored specific signal, and generate the control signal according to the target operation mode setting.

14. The wireless communication receiver of claim 1, wherein the second signal processing circuit is arranged to generate a second processed signal by processing the first processed signal.

15. The wireless communication receiver of claim 1, wherein the detecting circuit is arranged to monitor the specific signal for detecting if a blocker signal exists, and when the voltage level or the current level of the monitored specific signal shows a detecting result indicative of existence of the blocker signal, the detecting circuit generates the control signal.

16. The wireless communication receiver of claim 1, wherein the criterion is that the voltage level or the current level of the monitored specific signal reaches a predetermined threshold.

17. A wireless communication method, comprising:
utilizing a first signal processing circuit to receive a radio frequency (RF) signal and generate a first processed signal by processing the received RF signal;
coupling a second signal processing circuit to the first signal processing circuit;
monitoring a specific signal of the first signal processing circuit; and
generating at least a control signal to the second signal processing circuit in response to a voltage level or a current level of the monitored specific signal, wherein the control signal controls the second signal processing circuit to switch from a first operation mode to a second operation mode when it is determined that the voltage level or the current level of the monitored specific signal meets a criterion.

18. The wireless communication method of claim 17, wherein a circuit behavior of the first signal processing circuit is affected by a blocker signal.

19. The wireless communication method of claim 17, wherein the first signal processing circuit includes a low-noise amplifier (LNA), and the specific signal is an input signal fed into the LNA, an output signal generated from the LNA, or indicative of a bias condition of the LNA.

20. The wireless communication method of claim 17, wherein the step of generating at least the control signal to the second signal processing circuit comprises:
utilizing the control signal to control the second signal processing circuit to switch from the first operation mode to the second operation mode by making at least one circuit element in the second signal processing circuit have a change in its operational characteristic.

21. The wireless communication method of claim 17, wherein the second signal processing circuit includes a mixer module having a first operational characteristic; and the step of generating at least the control signal to the second signal processing circuit comprises:
utilizing the control signal to configure the mixer module to have a second operational characteristic different from the first operational characteristic such that the second signal processing circuit is switched from the first operation mode to the second operation mode.

22. The wireless communication method of claim 21, wherein the first operational characteristic and the second operational characteristic are different input impedance values, or different linearity values, or different power consumption values.

23. The wireless communication method of claim 17, wherein the second signal processing circuit includes a local oscillator (LO) signal generating module having a first operational characteristic; and the step of generating at least the control signal to the second signal processing circuit comprises:
utilizing the control signal to configure the LO signal generating module to have a second operational characteristic different from the first operational characteristic such that the second signal processing circuit is switched from the first operation mode to the second operation mode.

24. The wireless communication method of claim 23, wherein the first operational characteristic and the second operational characteristic are different phase noise values or different power consumption values.

25. The wireless communication method of claim 17, wherein the second signal processing circuit includes a baseband signal processing module having a first operational characteristic; and the step of generating at least the control signal to the second signal processing circuit comprises:
   utilizing the control signal to configure the baseband signal processing module to have a second operational characteristic different from the first operational characteristic such that the second signal processing circuit is switched from the first operation mode to the second operation mode.

26. The wireless communication method of claim 25, wherein the first operational characteristic and the second operational characteristic are different linearity values or different power consumption values.

27. The wireless communication method of claim 17, wherein the RF signal transmits a plurality of signal bursts including a first signal burst, and the step of monitoring the specific signal of the first signal processing circuit is enabled before the first signal processing circuit starts receiving the first signal burst and is not reset until the first signal processing circuit finishes receiving the first signal burst.

28. The wireless communication method of claim 27, wherein when an input power of a wanted frequency band within the first signal burst exceeds a predetermined threshold, the step of monitoring the specific signal of the first signal processing circuit reset at an end of the first signal burst is not enabled before the first signal processing circuit starts receiving a second signal burst following the first signal burst.

29. The wireless communication method of claim 17, wherein the step of generating at least the control signal to the second signal processing circuit comprises:
   providing a mapping table which records a plurality of operation mode settings of the second signal processing circuit mapped to a plurality of voltage levels or current levels of the monitored specific signal, respectively; and
   searching the mapping table for a target operation mode setting corresponding to the voltage level or the current level of the monitored specific signal, and generating the control signal according to the target operation mode setting.

30. The wireless communication method of claim 17, further comprising:
   utilizing the second signal processing circuit to generate a second processed signal by processing the first processed signal.

31. The wireless communication method of claim 17, wherein the step of generating at least the control signal to the second signal processing circuit comprises:
   monitoring the specific signal for detecting if a blocker signal exists; and
   when the voltage level or the current level of the monitored specific signals shows a detecting result indicative of existence of the blocker signal, generating the control signal.

32. The wireless communication method of claim 17, wherein the criterion is that the voltage level or the current level of the monitored specific signal reaches a predetermined threshold.

* * * * *